(12) United States Patent
Yu et al.

(10) Patent No.: US 9,855,522 B2
(45) Date of Patent: Jan. 2, 2018

(54) AIR PURIFIER

(71) Applicant: LG ELECTRONICS INC., Seoul (KR)

(72) Inventors: Gibong Yu, Seoul (KR); Kyoungho Lee, Seoul (KR); Sangjin Cha, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/921,250

(22) Filed: Oct. 23, 2015

(65) Prior Publication Data

US 2016/0114276 A1    Apr. 28, 2016

(30) Foreign Application Priority Data

Oct. 24, 2014  (KR) .......................... 10-2014-0145279
Nov. 5, 2014  (KR) .......................... 10-2014-0152980
Nov. 5, 2014  (KR) .......................... 10-2014-0152982
Nov. 5, 2014  (KR) .......................... 10-2014-0152983

(51) Int. Cl.
*B01D 46/00* (2006.01)
*F24F 13/20* (2006.01)
*F24F 3/16* (2006.01)

(52) U.S. Cl.
CPC ....... *B01D 46/0039* (2013.01); *B01D 46/009* (2013.01); *B01D 46/0038* (2013.01); *B01D 46/0041* (2013.01); *B01D 46/0086* (2013.01); *F24F 3/1603* (2013.01); *F24F 13/20* (2013.01)

(58) Field of Classification Search
USPC .............................................. 55/471; 96/418
See application file for complete search history.

(56) References Cited

U.S. PATENT DOCUMENTS

| 6,494,940 | B1 | 12/2002 | Hak | |
|---|---|---|---|---|
| 6,913,637 | B2 * | 7/2005 | Kim ................... | B01D 46/0023 55/309 |
| 2004/0031248 | A1 * | 2/2004 | Lindsay ............. | B01D 46/0023 55/385.3 |
| 2007/0034082 | A1 * | 2/2007 | Adair ..................... | B01D 45/06 96/63 |
| 2011/0308210 | A1 * | 12/2011 | Crabtree ............ | B01D 46/0005 55/483 |
| 2015/0306533 | A1 * | 10/2015 | Matlin ................. | B01D 46/448 96/420 |

FOREIGN PATENT DOCUMENTS

| CN | 201196464 Y | 2/2009 |
|---|---|---|
| JP | 2855840 B2 | 2/1999 |
| JP | 2002-159813 A | 6/2002 |
| JP | 2003-206036 A | 7/2003 |

(Continued)

*Primary Examiner* — T. Bennett McKenzie
(74) *Attorney, Agent, or Firm* — Dentons US LLP

(57) ABSTRACT

An air purifier, capable of maximizing air purification capacity thereof while having a minimum installation area, includes a body, a suction unit arranged within the body, having a suction port with a periphery surface that is inclined from a central axis of the body, a discharge unit arranged within the body, having a discharge port with a periphery surface that is inclined from the body, and a blowing unit arranged within the body, to blow air from the suction unit to the discharge unit.

15 Claims, 21 Drawing Sheets

(56) References Cited

FOREIGN PATENT DOCUMENTS

| | | |
|---|---|---|
| JP | 2006-263493 A | 10/2006 |
| JP | 2009-504385 A | 2/2009 |
| JP | 2011-78937 A | 4/2011 |
| KR | 10-1999-0019479 A | 3/1999 |
| KR | 20-0326111 Y1 | 9/2003 |
| KR | 20-2011-0004197 U | 4/2011 |
| KR | 10-2011-0066368 A | 6/2011 |
| KR | 10-2014-0025844 A | 3/2014 |
| WO | 0226349 A1 | 4/2002 |

\* cited by examiner

AIR PURIFIER

CROSS-REFERENCE TO RELATED APPLICATION

This application claims priority to Korean Patent Application Nos. 10-2014-0145279, filed on Oct. 24, 2014; 10-2014-0152980, filed on Nov. 5, 2014; 10-2014-0152982, filed on Nov. 5, 2014; and 10-2014-0152983, filed on Nov. 5, 2014, the entire disclosure of each is incorporated herein by reference.

BACKGROUND

1. Field

The present disclosure relates to an air purifier, and more particularly to an air purifier capable of maximizing air purification capacity while having a minimum installation area (i.e., apparatus footprint).

2. Description of the Related Art

An air purifier is an apparatus for converting contaminated air into fresh air through purification. An air purifier intakes contaminated air by a fan, and collects fine dust and/or bacteria from the intake air by a filter while removing odor components such as body odor and cigarette smells.

The air purifier as mentioned above should effectively remove contaminants contained in air while minimizing energy consumption. Additionally, the air purifier should not only have an increased air purification capacity while occupying a reduced space when installed in an indoor space, but also provide convenience of use.

SUMMARY

It is an object to provide an air purifier capable of minimizing an installation area thereof while achieving an increase in air purification capacity.

In accordance with an aspect of the present disclosure, the above and other objects can be accomplished by the provision of an air purifier including a body, a suction unit arranged within the body, having a suction port with a periphery surface that is inclined from a central axis of the body, a discharge unit arranged within the body, having a discharge port with a periphery surface that is inclined from the central axis of the body, and a blowing unit arranged within the body, to blow air from the suction unit to the discharge unit.

BRIEF DESCRIPTION OF THE DRAWINGS

The above and other objects, features, and other advantages will be more clearly understood from the following detailed description taken in conjunction with the accompanying drawings, in which.

DETAILED DESCRIPTION

Reference will now be made in detail to embodiments, examples of which are illustrated in the accompanying drawings. However, the present disclosure may be embodied in many different forms and should not be construed as limited to the embodiments set forth herein. Rather, these embodiments are provided so that this disclosure will be thorough and complete, and will fully convey the scope of the disclosure to those skilled in the art. The present disclosure is defined by the categories of the claims. Wherever possible, the same reference numbers may be used throughout the drawings to refer to the same or like parts.

Hereinafter, the present disclosure will be described with reference to the drawings for explaining air purifiers according to embodiments of the present invention.

Figure 1:
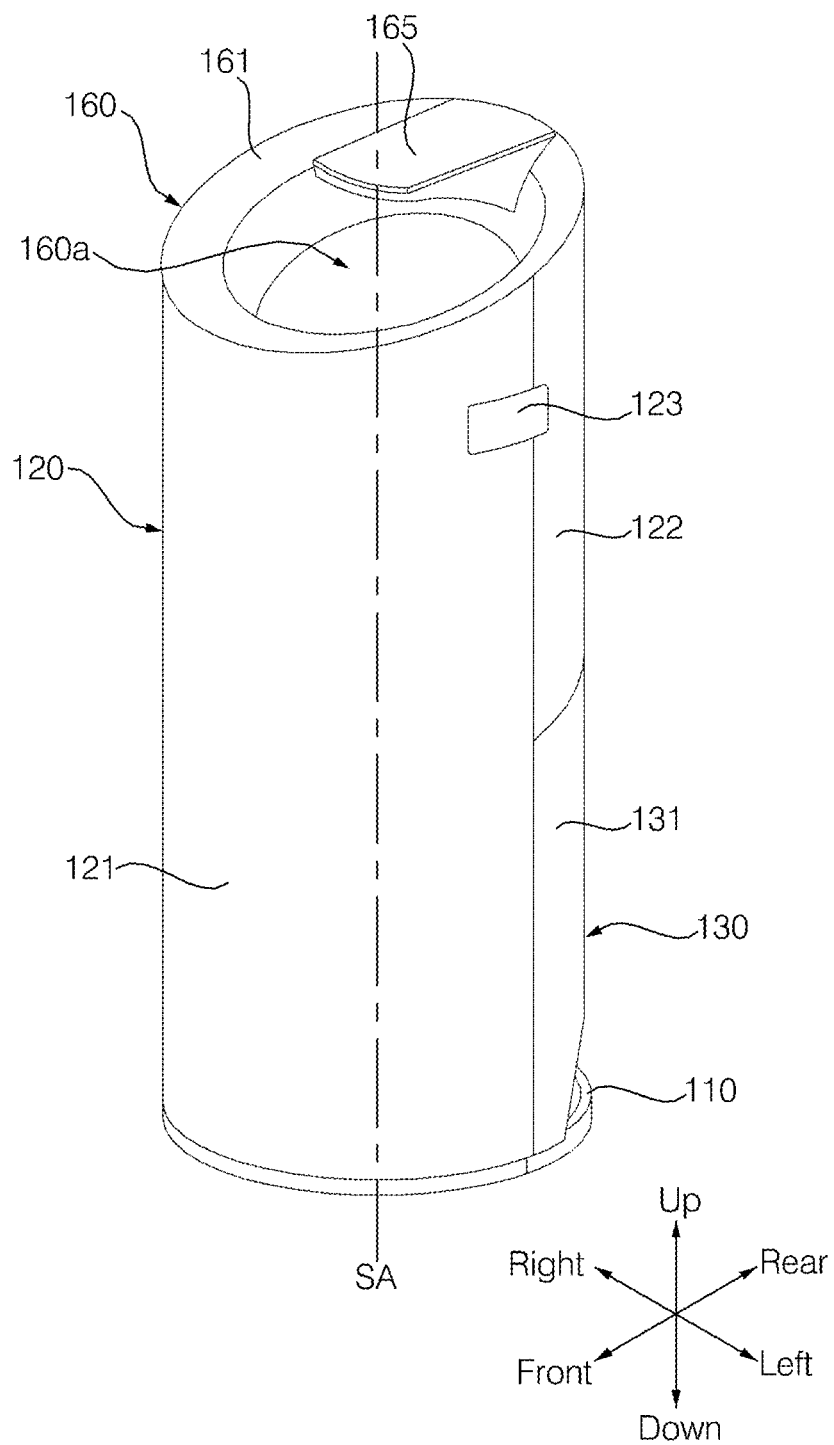
FIG. 1 is a front perspective view of an air purifier according to an embodiment of the present invention.
Figure 2:
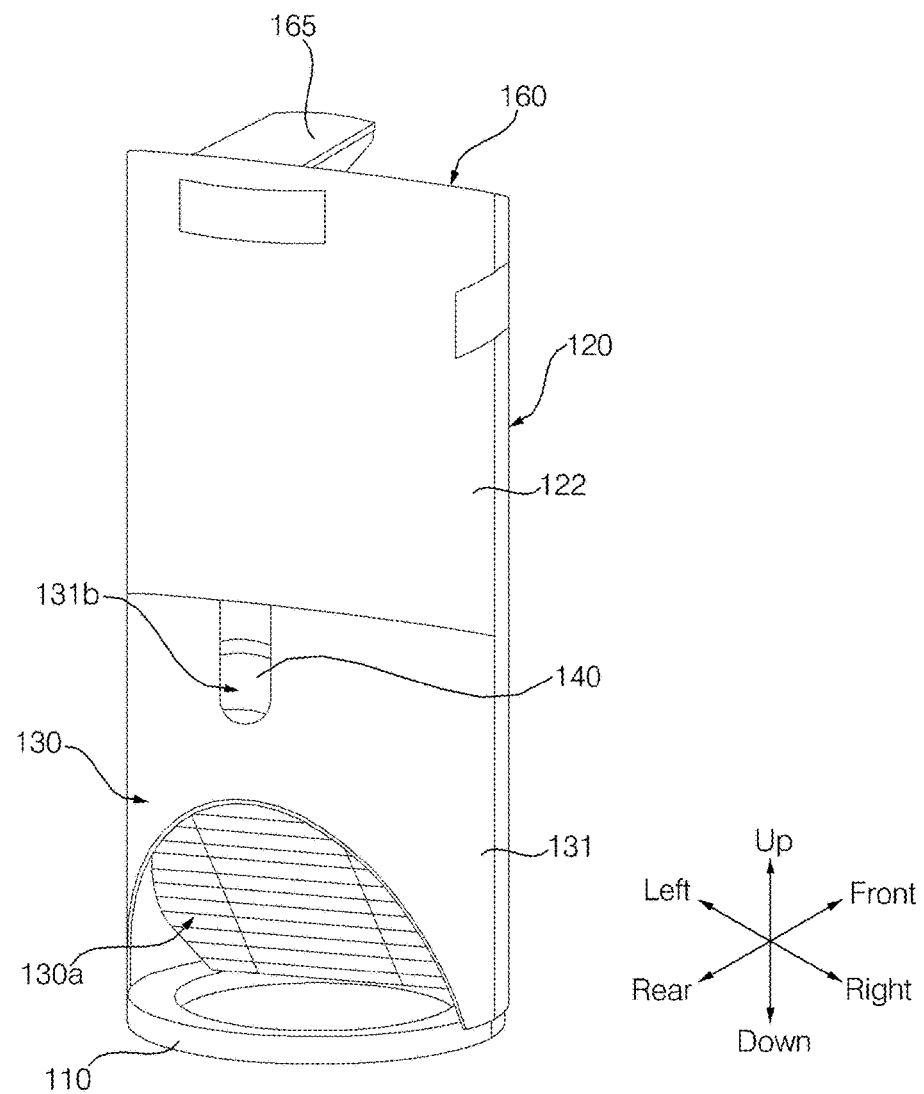
FIG. 2 is a rear perspective view of the air purifier illustrated in FIG. 1.
Figure 3:
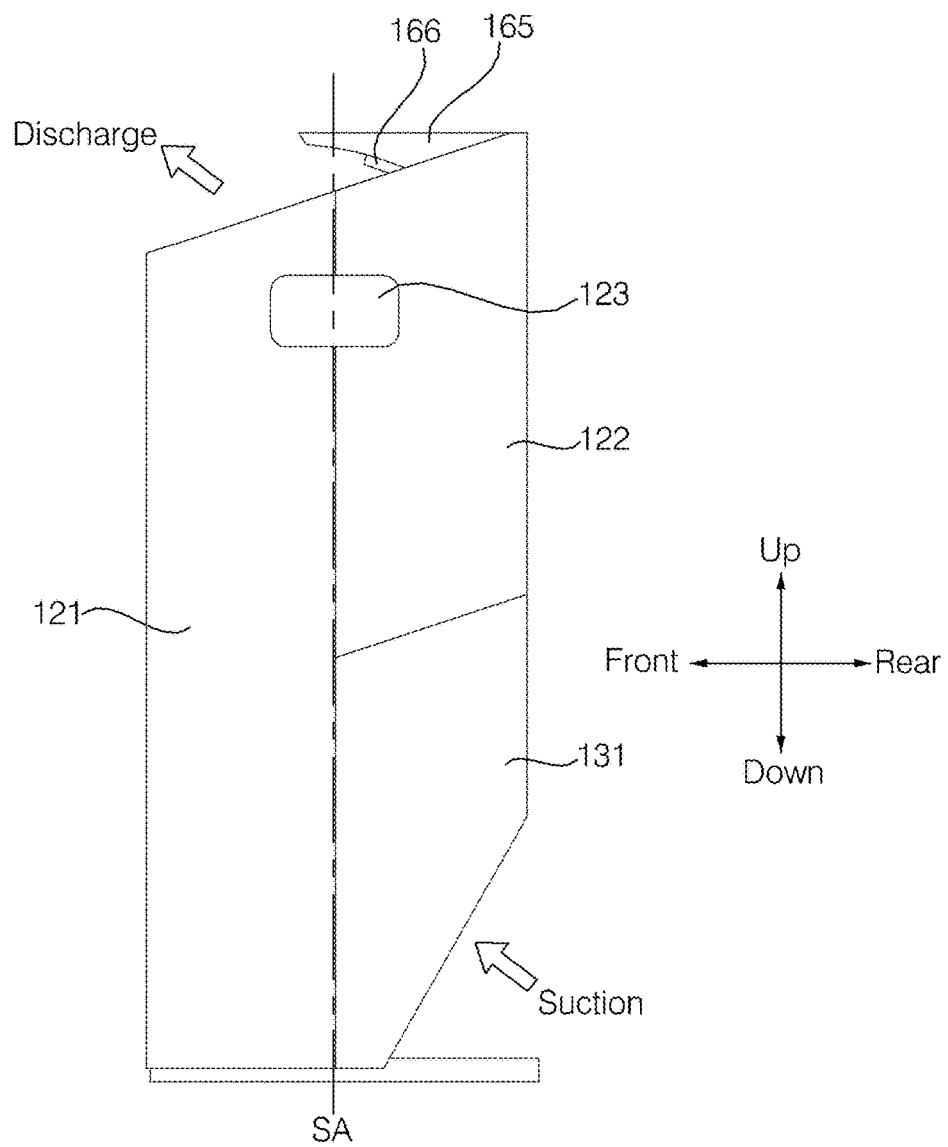
FIG. 3 is a side view of the air purifier illustrated in FIG. 1.
Figure 4:
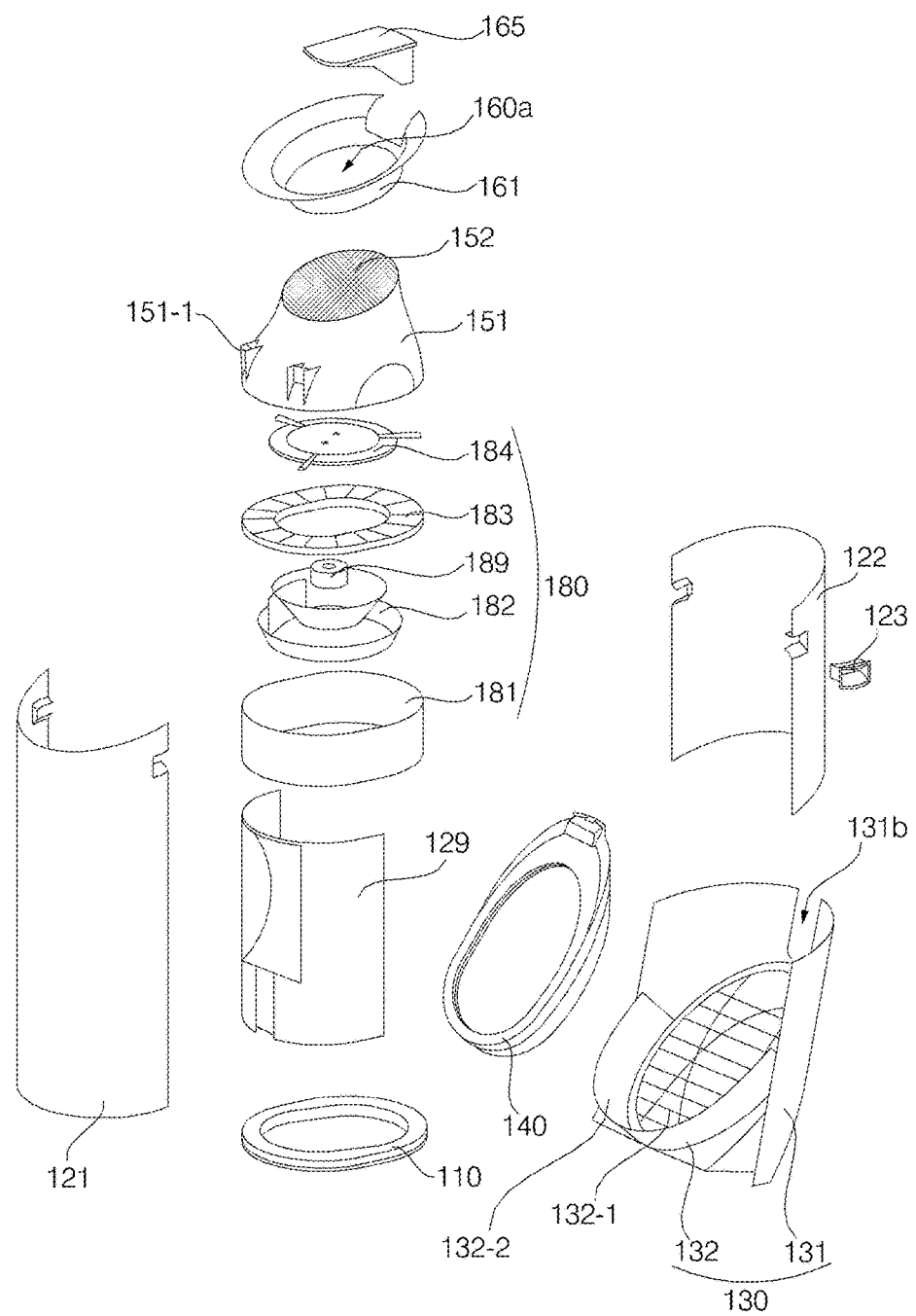
FIG. 4 is an exploded perspective view of the air purifier illustrated in FIG. 1.

FIG. 1 is a front perspective view of an air purifier according to an embodiment of the present invention. FIG. 2 is a rear perspective view of the air purifier illustrated in FIG. 1. FIG. 3 is a side view of the air purifier illustrated in FIG. 1. FIG. 4 is an exploded perspective view of the air purifier illustrated in FIG. 1.

The air purifier according to the illustrated embodiment of the present invention includes a base 110, a body 120 having a cylindrical shape at a portion thereof, a suction unit 130 provided at a lower portion of body 120, and formed with a suction port 130a, to intake air (i.e., suck in air), a discharge unit 160 provided at an upper portion of body 120, and formed with a discharge port 160a, through which the intake air sucked into suction port 130a is discharged, and a blowing unit 180 disposed within body 120, to blow air from the side of suction unit 130 to the side of discharge unit 160.

In the following description, "front", "rear", "forward direction", "rearward direction", "left direction", "right direction, "upward direction", and "downward direction" refer to those of FIGS. 1 to 3. The upward and downward directions are directions perpendicular to a surface (e.g., floor), on which the air purifier is seated. The downward direction is a gravity direction, whereas the upward direction is a direction reverse to the downward direction. The forward and rearward directions and the left and right directions are directions parallel to the surface (e.g., floor). The left and right directions are directions perpendicular to the forward and rearward directions. The front is a side, at which a front panel 121 to be described later is arranged. The rear is a side, at which a rear panel 122 to be described later is arranged. The left direction is directed left from a central axis SA of body 120, namely, a central axis of body 120, whereas the right direction is directed right from the central axis SA of body 120. The central axis SA is perpendicular to the surface (e.g., floor), on which the air purifier is seated, while being parallel to the upward and downward directions. A horizontal direction is parallel to the surface (e.g., floor), on which the air purifier is seated.

Base 110 is seated on the surface (e.g., floor), to support body 120. Base 110 has a circular periphery. Base 110 may have a hollow central portion, to take a ring shape.

Base 110 is coupled to body 120. Body 120 and suction unit 130 are coupled to a top of base 110. Body 120 is coupled to a front semicircular portion of base 110. Suction unit 130 is rotatably coupled to a rear semicircular portion of base 110, to which body 120 is not coupled. The rear side of the rear semicircular portion of base 110 is spaced apart from the rear side of suction unit 130.

Body 120 has, at a portion thereof, a cylindrical shape having a central axis SA perpendicular to the surface (e.g., floor). Body 120 is coupled to the top of base 110, to be supported by base 110. The cylindrical portion of body 120 has a circular horizontal cross-section and, as such, has a periphery coinciding or almost coinciding with the periphery of base 110.

Discharge unit 160 is arranged at an upper portion of body 120, whereas suction unit 130 is arranged at a lower portion of body 120. Blowing unit 180 is arranged within body 120, together with a duct 151. Base 110 is coupled to a bottom of body 120. In detail, body 120 is coupled to the front semicircular portion of base 110.

Body 120 includes a front panel 121 having a half-cylindrical shape, a rear panel 122 coupled to an upper portion of front panel 121 while having a half-cylindrical shape, an inner panel 129 disposed at a rear side of front panel 121, and coupled to base 110, and a handle 123 coupled to side surfaces of front panel 121 and rear panel 122.

Front panel 121 is formed to have a half-cylindrical shape, and defines a front appearance of body 120. At least one horizontal cross-section of front panel 121 may have a semicircular shape.

Front panel 121 has a lower end with a periphery defining a surface perpendicular to the central axis SA, namely, parallel to the floor, on which air purifier is seated. The periphery of the lower end of front panel 121 has a semicircular shape. The lower-end periphery of front panel 121 may coincide or almost coincide with the periphery of the front semicircular portion of base 110, to fit the periphery of the front semicircular portion of base 110.

Front panel 121 has an upper end with a periphery defining a surface inclined from the central axis SA. The surface defined by the periphery of the upper end of front panel 121 extends in forward and upward directions. The upper-end periphery of front panel 121 has a parabolic shape. The surface defined by the upper-end periphery of front panel 121 may coincide with a surface defined by the periphery of an upper end of discharge port 160a or may be parallel thereto. That is, the upper-end periphery of front panel 121 may coincide or almost coincide with a front portion of the upper-end periphery of discharge port 160a, to fit the front portion of the upper-end periphery of discharge port 160a.

The side surface of front panel 121 is open at a portion thereof, to allow handle 123 to be coupled thereto.

Inner panel 129, blowing unit 180, duct 151 and discharge unit 160 are arranged at the rear side of front panel 121. Front panel 121 is disposed to overlap the half-cylindrical inner panel 129. Front panel 121 has a rear surface facing a front surface of inner panel 129. Base 110 is disposed beneath front panel 121.

Rear panel 122 is formed to have a half-cylindrical shape, and defines a rear appearance of body 120. At least one horizontal cross-section of rear panel 122 may have a semicircular shape. Rear panel 122 is coupled to the upper portion of front panel 121 at the rear side of front panel 121, thereby forming a cylindrical appearance. Rear panel 122 is disposed over suction unit 130, thereby forming a half-cylindrical rear appearance.

Rear panel 122 has an upper end with a periphery defining a surface inclined from the central axis SA. The surface defined by the upper-end periphery of rear panel 122 extends in forward and upward directions. The upper-end periphery of rear panel 122 has a parabolic shape. The surface defined by the upper-end periphery of rear panel 122 is in the same plane as the surface defined by the upper-end periphery of front panel 121. The upper-end periphery of rear panel 122 may extend to be joined with the upper-end periphery of front panel 121 and, as such, an oval shape is formed.

The surface defined by the upper-end periphery of rear panel 122 may coincide with the surface defined by the upper-end periphery of discharge port 160a or may be parallel thereto. That is, the upper-end periphery of rear panel 122 may coincide or almost coincide with a rear portion of the upper-end periphery of discharge port 160a, to fit the rear portion of the upper-end periphery of discharge port 160a.

Rear panel 122 has a lower end with a periphery defining a surface inclined from the central axis SA. The surface defined by the periphery of the lower end of rear panel 122 extends in rearward and downward directions. The lower-end periphery of rear panel 122 has a parabolic shape. The surface defined by the lower-end periphery of rear panel 122 may be parallel to the surface defined by the upper-end periphery of rear panel 122.

The surface defined by the lower-end periphery of rear panel 122 may coincide with a surface defined by a portion of the upper-end periphery of suction unit 130 or may be parallel thereto. That is, the lower-end periphery of rear panel 122 may coincide or almost coincide with a portion of the upper-end periphery of suction unit 130, to fit the portion of the upper-end periphery of suction unit 130.

The side surface of rear panel 122 is open at a portion thereof, to allow handle 123 to be coupled thereto.

Blowing unit 180, duct 151 and discharge unit 160 are arranged at a front side of rear panel 122. A filter unit 140 is disposed beneath rear panel 122, together with suction unit 130.

Inner panel 129 has a half-cylindrical shape, and is coupled to the top of base 110 at a front side of base 110. At least one horizontal cross-section of inner panel 129 may have a semicircular shape.

Inner panel 129 has a lower end with a periphery defining a surface perpendicular to the central axis SA, namely, parallel to the floor, on which the air purifier is seated. Inner panel 129 is coupled, at a lower end thereof, to a top of the front semicircular portion of base 110. Lower-end periphery of inner panel 129 may have a smaller radius than the periphery of base 110.

Inner panel 129 has an upper end with a periphery defining a surface perpendicular to the central axis SA, namely, parallel to the floor, on which the air purifier is seated. The surface defined by the upper-end periphery of inner panel 129 is parallel to the surface defined by the lower-end periphery of inner panel 129. The upper end of inner panel 129 is coupled to blowing unit 180.

Inner panel 129 is arranged to overlap front panel 121. The front surface of inner panel 129 faces the rear surface of front panel 121. Blowing unit 180 is arranged over inner panel 129. Filter unit 140 and suction unit 130 are arranged at a rear side of inner panel 129.

Inner panel 129 guides air introduced through the inclinedly formed suction port 130a to flow upwards. Inner panel 129 is arranged to extend vertically while surrounding an upper portion of the surface defined by the periphery of suction port 130a and, as such, guides air passing through filter unit 140 after entering suction port 130a such that the guided air flows to blowing unit 180.

Handle 123 is formed to extend to the inside of body 120 so as to allow the user to grasp handle 123. Handle 123 may be coupled to the side surface of front panel 121 and/or the side surface of rear panel 122. In the illustrated embodiment, handle 123 is coupled to both front panel 121 and rear panel 122 at opposite sides of the boundary between front panel 121 and rear panel 122. A plurality of handles 123 may be provided.

Hereinafter, coupling of front panel 121, rear panel 122 and inner panel 129 in body 120 and coupling thereof to other configurations will be described with reference to FIGS. 5 to 7.

Suction unit 130 is provided with suction port 130a and, as such, intakes ambient air. Suction unit 130 is arranged at the lower portion of body 120. Suction unit 130 is disposed beneath rear panel 122. Suction unit 130 is coupled to the rear side of inner panel 129 while being disposed at the rear side of front panel 121. The rear side of suction unit 130 is arranged over base 110 while being spaced apart from base 110 in an upward direction.

The surface defined by the periphery of suction port 130a in suction unit 130 is formed to be inclined from the central axis SA of the cylindrical portion of body 120. The surface defined by the periphery of suction port 130a is inclined from a horizontal direction toward front panel 121, to extend in forward and upward (rearward and downward) directions. Suction port 130a is formed to allow intake of air in a direction inclined from the central axis SA of the cylindrical portion of body 120. In detail, suction port 130a is formed to allow air to be sucked in forward and upward directions inclined from a front side where front panel 121 is arranged.

Having a surface of the suction port 130a and a surface of the discharge port 160a inclined facilitates efficient air flow through the air purifier.

Figure 22:
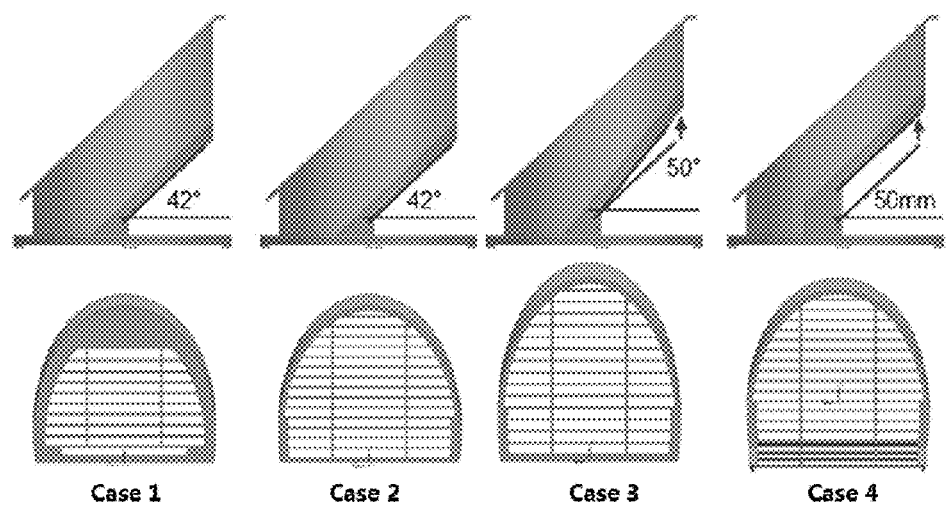
FIG. 22 is a side view illustrating several inclination angles for the suction port of the air purifier illustrated in FIG. 3.

FIG. 22 illustrates several designs for the inclined suction port 130a. Each design has a suction port which is inclined relative to the horizontal direction (i.e., inclination angle). Three designs (cases 1, 2, and 4) are set at the same angle, but vary in horizontal and vertical position within the air purifier body. The other design (case 3) is slightly more vertical, 50 degrees versus 42 degrees. For the same flow rate, these illustrative changes affect the motor speed and noise generated. While a wide range of inclination angles are reasonable in this invention, some are more preferable in order to optimize (maximize suction area while meeting other criteria (e.g., motor speed, noise, etc.)) the design. An inclination angle range of 30-70 degrees is preferred. An inclination angle range of 40-60 degrees is more preferred. And an inclination angle range of 48-52 degrees is even more preferred.

The periphery of suction port 130a is formed to have an oval shape and, as such, suction port 130a has a maximum suction area. Accordingly, a maximum amount of air is introduced into oval suction port 130a. The cross-section inclined from the central axis SA of cylindrical body 120 has an oval shape. Accordingly, suction port 130a is formed to have a cross-section corresponding to the oval cross-section and, as such, the amount of air sucked through suction port 130a is maximized.

The surface defined by the periphery of suction port 130a may be further inclined from the horizontal direction than the surface defined by the upper-end periphery of discharge port 160a. The surface defined by the periphery of suction port 130a is inclined to be closer to a vertical direction than the surface defined by the upper-end periphery of discharge port 160a and, as such, the suction area of suction port 130a is greater than the discharge area of discharge port 160a.

In one embodiment, the suction port 130a, discharge port 160a, and filter unit 140 are each inclined at substantially the same angle relative to the central axis.

Base 110 is disposed beneath suction unit 130. Suction unit 130 is arranged to be spaced apart from the rear semicircular portion of base 110. Air is sucked through the space between suction unit 130 and base 110.

Filter unit 140 is seated in the inside of suction unit 130. Rear panel 122 is arranged over suction unit 130. Inner panel 129 and front panel 121 of body 120 are arranged at the front side of suction unit 130.

Suction unit 130 is rotatably coupled to inner panel 129 and base 110. Suction unit 130 is open from body 120 in downward and rearward directions, to allow filter unit 140 to be inserted into or separated from body 120. This will be described in detail later with reference to FIGS. 11 to 13.

Suction unit 130 includes a suction panel 131 having a half-cylindrical shape, and a suction body 132, at which suction port 130a is formed and in which filter unit 140 is seated.

Suction panel 131 has a half-cylindrical shape at a portion thereof, and forms a rear appearance. At least one horizontal cross-section of suction panel 131 may have a semicircular shape. Suction panel 131 is coupled to the lower portion of front panel 121 at the rear side of the front panel and, as such, forms a cylindrical appearance, together with body 120. Suction panel 131 is arranged beneath rear panel 122 and, as such, forms a half-cylindrical rear appearance.

Suction panel 131 has an upper end with a periphery defining a surface inclined from the central axis SA. The surface defined by the upper-end periphery of suction panel 131 extends in forward and upward directions. The upper-end periphery of suction panel 131 has a parabolic shape. The surface defined by the upper-end periphery of suction panel 121 may coincide with the surface defined by the lower-end periphery of rear panel 122 or may be parallel thereto. The surface defined by the upper-end periphery of suction panel 121 may coincide or almost coincide with the surface defined by the lower-end periphery of rear panel 122, to fit the latter surface.

Suction panel 131 has a filter identifier 131b at a portion of the upper-end periphery thereof. Filter identifier 131b is formed by opening the upper-end periphery portion of suction panel 131, to expose outwards a portion of filter unit 140. Filter identifier 131b is formed by recessing the upper end of suction panel 131 in a downward direction, to form a U-shaped structure.

Suction panel 131 also has a lower end with a periphery defining a surface inclined from the central axis SA. The surface defined by the lower-end periphery of suction panel 131 extends in forward and upward directions. The lower-end periphery of suction panel 131 has a parabolic shape. The surface defined by the lower-end periphery of suction panel 131 may be further inclined from the horizontal direction than the surface defined by the upper-end periphery of suction panel 131. The surface defined by the lower-end periphery of suction panel 131 may be inclined to be closer to the vertical direction than the surface defined by the upper-end periphery of suction panel 131, to increase the suction area of suction port 130a.

Suction body 132 is formed with oval suction port 130a. Suction body 132 is formed, at suction port 130a thereof, with a suction grill 132-1. Suction grill 132-1 of suction body 132 is formed at the surface defined by the periphery of suction port 130a while taking a grill shape. Filter unit 140 is seated over suction grill 132-1. In an embodiment, suction grill 132-1 may be formed at suction panel 131.

The surface defined by suction grill 132-1 may be inclined from the central axis SA of the cylindrical portion of body 120 and, as such, filter unit 140 may be inclinedly arranged within body 120. The surface defined by suction grill 132-1 is inclined toward front panel 121, to extend in forward and upward (rearward and downward) directions, and, as such, supports a lower surface of filter unit 140.

A filter support 132-2 is formed at a lower portion of suction body 132. Filter support 132-2 protrudes in a direction perpendicular to the surface defined by suction grill 132-1. Filter support 132-2 supports a portion of the side surface of filter unit 140. Filter support 132-2 protrudes from a lower-end periphery of suction body 132 while having a U-shaped cross-section.

Suction body 132 is coupled to suction panel 131 at an inside of suction panel 131. In an embodiment, suction body 132 and suction panel 131 may be formed to have an integrated structure.

Filter unit 140 purifies the intake air sucked through suction port 130a. Filter unit 140 collects fine dust or bacteria from the intake air while removing odor components.

Filter unit 140 has an oval periphery. The cross-section inclined from the central axis SA of cylindrical body 120 has an oval shape. Accordingly, the periphery of filter unit 140 is formed to have an oval shape corresponding to the oval cross-section.

Filter unit 140 has a filter surface, through which air passes. The filter surface of filter unit 140 has a periphery having an oval shape corresponding to that of the oval periphery of filter unit 140. The cross-section inclined from the central axis SA of cylindrical body 120 has an oval shape. Accordingly, the filter surface of filter unit 140 is formed to have an oval shape corresponding to the oval cross-section and, as such, the amount of air sucked through filter unit 140 is maximized.

Filter unit 140 is seated in suction unit 130 within body 120. Filter unit 140 is inclinedly arranged within body 120 while corresponding to inclined suction port 130a. The filter surface of filter unit 140 is inclinedly arranged with respect to the central axis SA and, as such, the amount of air passing through filter unit 140 is maximized.

Filter unit 140 is separably coupled to suction unit 130.

A detailed description of filter unit 140 will be given later with reference to FIGS. 8 to 11.

Blowing unit 180 is arranged within body 120, to blow air in an upward direction. Blowing unit 180 has an almost circular periphery. Blowing unit 180 blows air in a direction perpendicular to the surface (e.g., floor), on which the air purifier is seated. Blowing unit 180 is arranged between suction unit 130 and duct 151, to blow air from the side of suction unit 130 to the side of duct 151.

Blowing unit 180 is disposed over inner panel 129. Blowing unit 180 is coupled, at a front side thereof, to a top of inner panel 129. Coupling between blowing unit 180 and inner panel 129 will be described later with reference to FIG. 5.

Blowing unit 180 includes a motor 189 for generating rotational force, a blowing fan 182 for blowing air through rotation thereof caused by motor 189, a blowing unit body 181 coupled to body 120 while surrounding a lower portion of blowing fan 182, a vane member 183 arranged over blowing fan 182, to guide air blown by blowing fan 182 toward discharge unit 160, and a motor cover 184 arranged over a central portion of vane member 183, to cover motor 189.

Blowing unit 180 will be described in more detail later with reference to FIGS. 14 to 17.

Duct 151 is arranged over blowing unit 180, to guide air blown by blowing unit 180 toward discharge unit 160. Duct 151 is disposed within body 120. Duct 151 is coupled to a top side of blowing unit 180. Discharge unit 160 is disposed over duct 151.

Duct 151 has a lower end with a periphery defining a surface perpendicular to the central axis SA (namely, horizontally parallel to the floor). The lower-end periphery of duct 151 may coincide or almost coincide with the upper-end periphery of vane member 183, to fit the upper-end periphery of vane member 183. Duct 151 also has an upper end with a periphery defining a surface inclined from the central axis SA. The upper-end periphery of duct 151 may coincide or almost coincide with the lower-end periphery of discharge unit 160, to fit the lower-end periphery of discharge unit 160. The upper-end periphery of duct 151 coincides with the lower-end periphery of discharge port 160a.

The surface defined by the upper-end periphery of duct 151 has a smaller size than the surface defined by the lower-end periphery of duct 151. Duct 151 has an air introduction area greater than an air discharge area thereof. That is, duct 151 has an air channel narrowing gradually in an upward direction. Air flows through the air channel. As the internal air channel of duct 151 is narrowed in an air flow direction, the velocity of air flowing through the air channel is increased.

Duct 151 may be formed to guide air discharged to discharge unit 160 to flow in forward and upward directions. The shape of duct 151 will be described later with reference to FIG. 18.

A duct grill 152 is disposed at a top of duct 151. Duct grill 152 prevents foreign matter from being introduced into duct 151 and/or blowing unit 180 through discharge port 160*a*. Duct grill 152 is arranged between duct 151 and discharge unit 160.

Discharge unit 160 is formed with discharge port 160*a*, to discharge air to the outside. Discharge unit 160 is disposed over duct 151. Discharge unit 160 is arranged at a top of body 120.

The surface defined by the upper-end periphery of discharge port 160*a* of discharge unit 160 is inclined from the central axis SA of the cylindrical portion of body 120. The surface defined by the upper-end periphery of discharge port 160*a* extends in forward and upward directions. Discharge port 160*a* is formed to discharge air in a direction inclined from the central axis SA of the cylindrical portion of body 120. Discharge port 160*a* is formed to discharge air in forward and upward directions. As discharge port 160*a* is formed to discharge air in forward and upward directions, it is possible to prevent discharged air from again entering suction port 130*a* disposed below discharge port 160*a*.

The periphery of discharge port 160*a* has an oval shape and, as such, discharge port 160*a* has a maximum discharge area. Accordingly, a maximum amount of air is discharged through oval discharge port 160*a*. The cross-section inclined from the central axis SA of cylindrical body 120 has an oval shape. Accordingly, discharge port 160*a* is formed to have a cross-section corresponding to the oval cross-section and, as such, the amount of air discharged through discharge port 160*a* is maximized.

Discharge port 160*a* may have a lower end with a circular periphery. Even though the lower-end periphery of discharge port 160*a* is formed to have a circular shape, the upper-end periphery of discharge port 160*a* may be formed to have an oval shape.

The surface defined by the upper-end periphery of discharge port 160*a* may have a lower inclination with respect to the horizontal direction than the surface defined by the periphery of suction port 130*a*. The surface defined by the upper-end periphery of discharge port 160*a* may be inclined to be closer to the horizontal direction than the surface defined by the periphery of suction port 130*a*.

The discharge area of discharge port 160*a* may be smaller than the suction area of suction port 130*a* and, as such, smooth flow of air may be achieved.

The surface defined by the periphery of at least one of discharge port 160*a* and suction port 130*a* is inclined from the central axis SA of cylindrical portion of body 120. One of the discharge port 160*a* and suction port 130*a* may extend inclinedly, whereas the other of the discharge port 160*a* and suction port 130*a* may extend vertically or horizontally.

Discharge unit 160 includes a discharge panel 161 to define discharge port 160*a*, a console unit 165 disposed over discharge port 160*a* while covering a portion of discharge port 160*a*, to adjust a discharge direction of air discharged through discharge port 160*a*, and a lighting unit 166 disposed at a lower surface of console unit 165, to irradiate light onto discharge panel 161.

Discharge panel 161 defines an air channel, through which air flows, and forms an upper appearance. Discharge panel 161 has a frustoconical shape widening gradually in an upward direction.

At least one cross-section of discharge panel 161 has an oval shape. Discharge panel 161 has an upper end with an oval periphery, and a lower end with a circular or oval periphery.

Discharge panel 161 has an inner surface having at least a portion exposed outwards. The inner surface of discharge panel 161 is curved to diverge in an upward direction. Light emitted from lighting unit 166 is reflected from an upper portion of the inner surface of discharge panel 161.

The surface defined by the lower-end periphery of discharge panel 161 is inclined from the central axis SA, to fit the lower-end periphery of duct 151. The surface defined by the upper-end periphery of discharge panel 161 is inclined from central axis SA.

The surface defined by the upper-end periphery of discharge panel 161 is parallel or almost parallel to the surface defined by the lower-end periphery of discharge panel 161 and, as such, air flowing to discharge port 160*a* is discharged in forward and upward directions.

The surface defined by the upper-end periphery of discharge panel 161 has a greater size than the surface defined by the lower-end periphery of discharge panel 161. The air introduction area of discharge panel 161 is smaller than the air discharge area of discharge panel 161. The air channel of discharge panel 161, through which air flows, is gradually widened in an upward direction, to allow discharged air to be widely spread.

Console unit 165 is disposed over discharge port 160*a*, to cover a rear portion of discharge port 160*a*. Console unit 165 is coupled to a top of discharge panel 161 at a rear side of discharge panel 161.

Console unit 165 has an upper surface formed to be perpendicular to the central axis SA (namely, parallel to the floor in the horizontal direction, and a lower surface formed to have a shape corresponding to the shape of the inner surface of discharge panel 161 at a front side of discharge panel 161. The upper surface of console unit 165 has a rectangular shape. The lower surface of console unit 165 has an arch shape, to be closer to the horizontal direction parallel to the floor as the lower surface of console unit 165 extends in an upward direction. The lower surface of console unit 165 guides air discharged through discharge port 160*a* to flow as upward as possible. The lower surface of console unit 165 is formed to prevent air discharged through discharge port 160*a* from flowing rearwards and, as such, air discharged through the discharge port 160*a* is prevented from being directly re-introduced into the suction port 130*a*.

Flow of air guided by the duct 151, discharge panel 161 and console unit 165 will be described later with reference to FIG. 18.

Lighting unit 166 includes a light source to emit light and, as such, irradiates light onto an upper portion of the inner surface of discharge panel 161. A detailed description of lighting unit 166 will be given later with reference to FIGS. 18 to 20.

Figure 5:
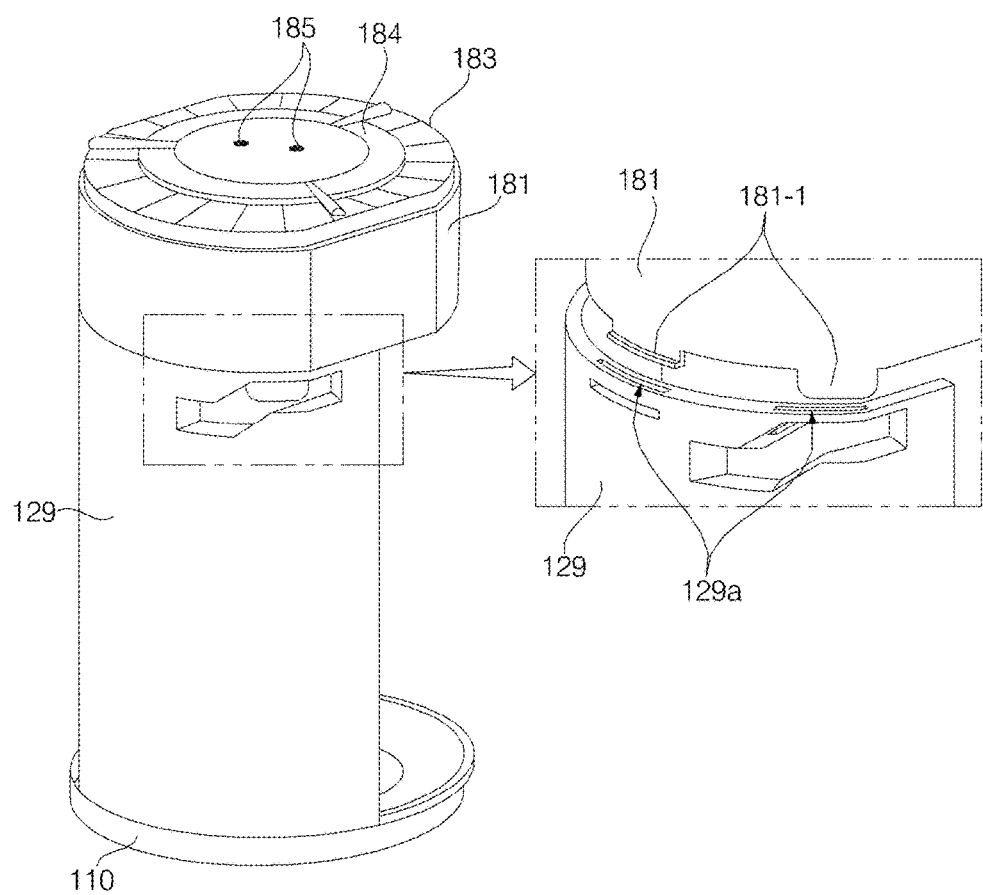
FIG. 5 is a perspective view illustrating a part of the configuration of the air purifier illustrated in FIG. 1.

FIG. 5 is a perspective view illustrating a part of the configuration of the air purifier illustrated in FIG. 1.

Blowing body 181 is formed, at a lower end thereof, with inner panel coupling protrusions 181-1 protruding downwards. Inner panel 129 is formed, at an upper end thereof, with protrusion receiving members 129*a* each having a hole structure to receive a corresponding one of the inner panel coupling protrusions 181-1. The inner panel coupling protrusions 181-1 are inserted into respective protrusion receiving members 129*a* and, as such, blowing unit 180 is coupled to inner panel 129 of body 120.

A hook may be formed at a lower end of each inner panel coupling protrusion 181-1, to be engaged with a corresponding one of the protrusion receiving members 129a. The hook may be formed as an "L" shape. The "L" shaped hook may be of sufficient size to distribute the coupling weight of the blowing body 181 evenly to the inner panel 129.

After blowing unit 180 is coupled to inner panel 129 of body 120 through insertion of the inner panel coupling protrusions 181-1 into respective protrusion receiving members 129a, blowing unit 180 and inner panel 129 of body 120 may be fastened by bolts.

Figure 6:
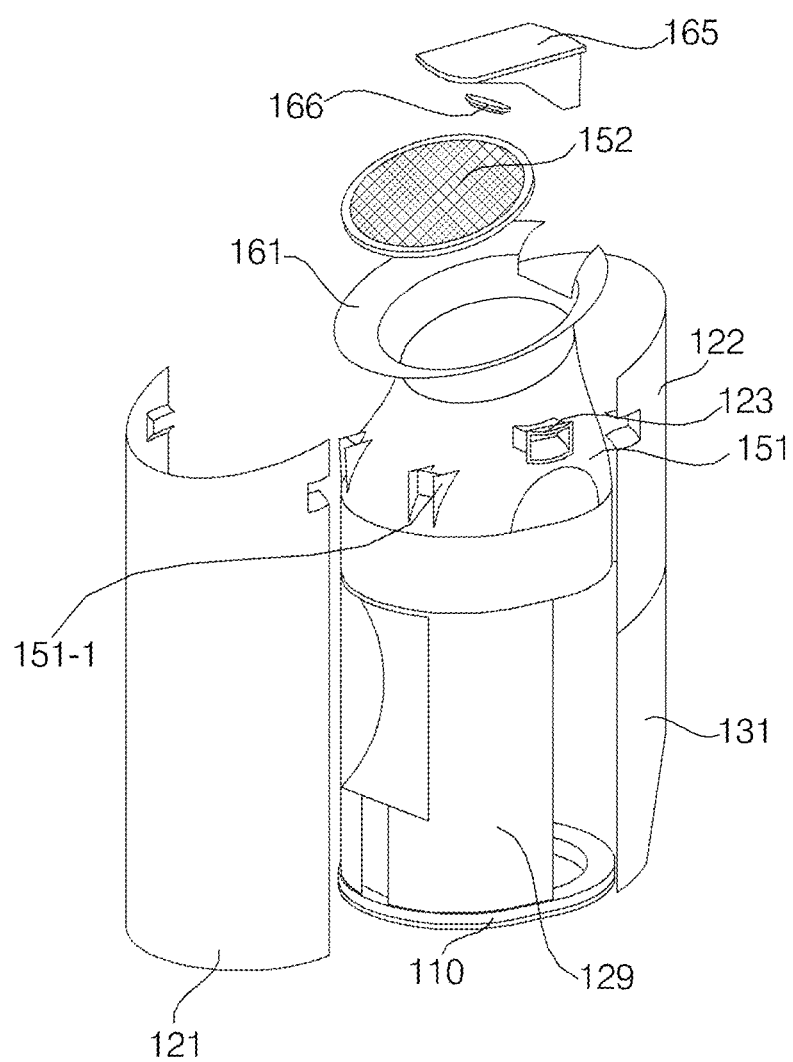
FIG. 6 is an exploded perspective view illustrating a portion of the air purifier illustrated in FIG. 1.
Figure 7:
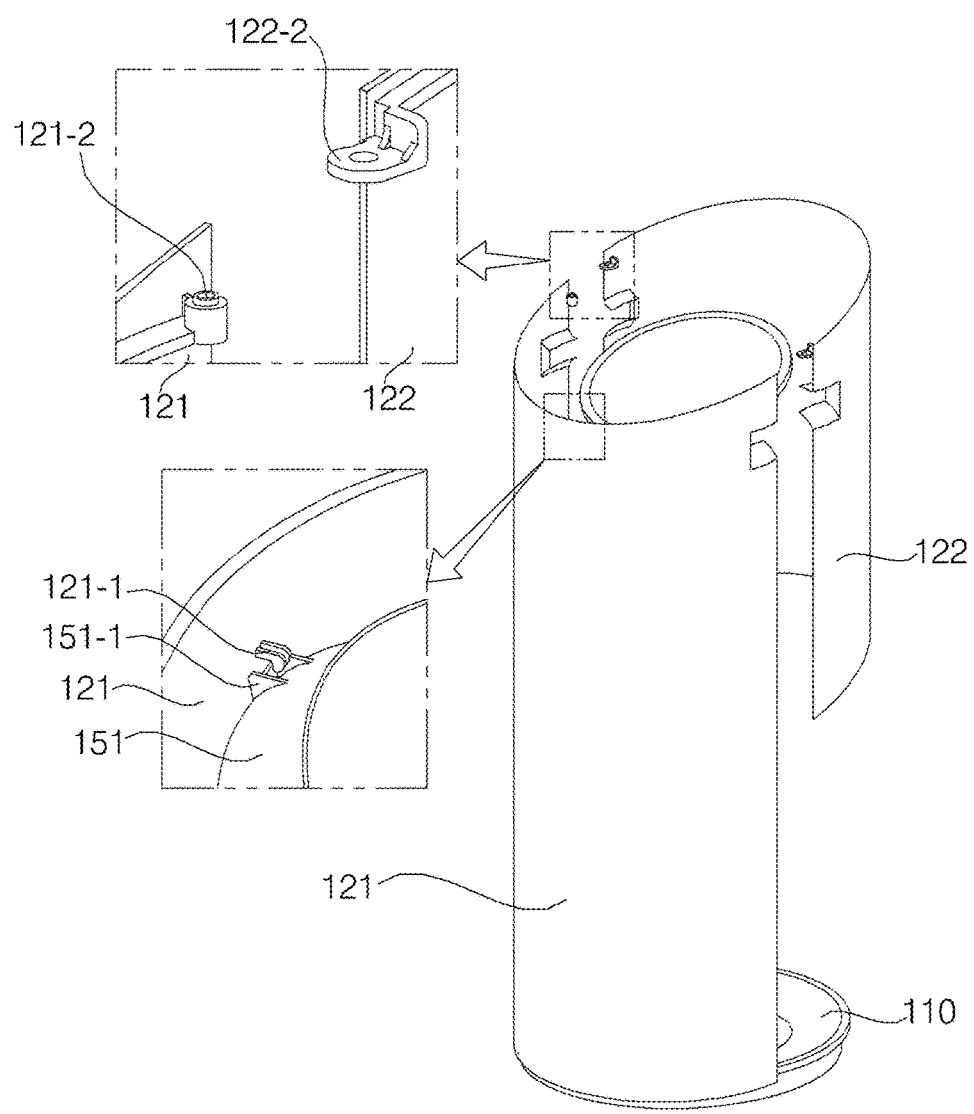
FIG. 7 is a view illustrating coupling of a part of the configuration in the air purifier illustrated in FIG. 1.

FIG. 6 is an exploded perspective view illustrating a portion of the air purifier illustrated in FIG. 1. FIG. 7 is a view illustrating coupling of a part of the configuration in the air purifier illustrated in FIG. 1.

Front panel 121 is formed, at the inner surface thereof, with duct coupling protrusions 121-1 protruding downwards. Duct 151 is formed, at an outer surface thereof, with protrusion receiving members 151-1 to receive respective duct coupling protrusions 121-1. Duct coupling protrusions 121-1 are inserted into respective protrusion receiving members 151-1 and, as such, front panel 121 is coupled to duct 151.

After front panel 121 is coupled to duct 151, front panel 121 and inner panel 129 may be fastened by bolts.

front panel 121 is formed, at lateral ends of the inner surface thereof, with rear panel coupling protrusions 121-2 protruding upwards. Rear panel 122 is formed, at lateral ends of an inner surface thereof, with protrusion receiving members 122-2 to receive respective rear panel coupling protrusions 121-2. Rear panel coupling protrusions 121-2 are inserted into respective protrusion receiving members 122-2 and, as such, rear panel 122 is coupled to front panel 121.

After rear panel coupling protrusions 121-2 are inserted into respective protrusion receiving members 122-2, front panel 121 and rear panel 122 may be fastened by bolts.

As illustrated in FIG. 5, assembly of the air purifier may be achieved by coupling duct 151 to top of blowing unit 180 under the condition that blowing unit 180 and inner panel 129 of body 120 are fastened, fastening front panel 121 to inner panel 129 after coupling front panel 121 to duct 151, and then coupling rear panel 122 to front panel 121.

Figure 8A:
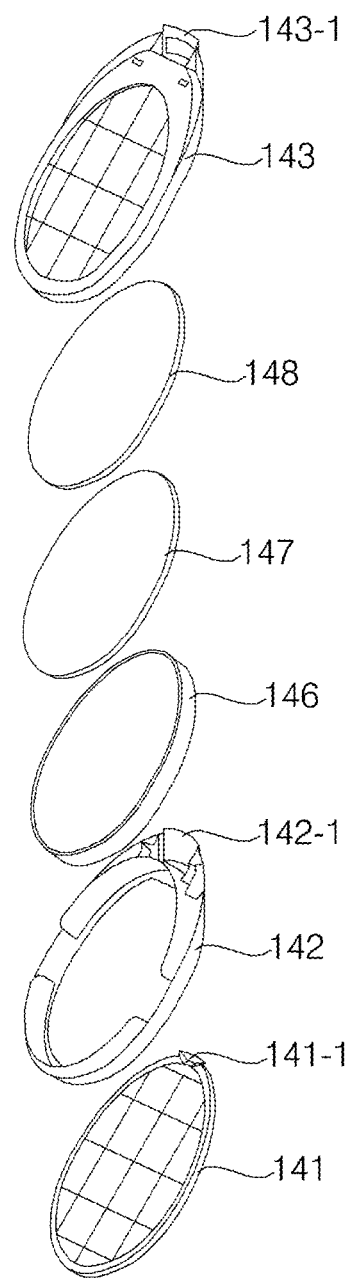
FIG. 8A is an exploded perspective view illustrating a filter unit of the air purifier illustrated in FIG. 1.
Figure 8B:
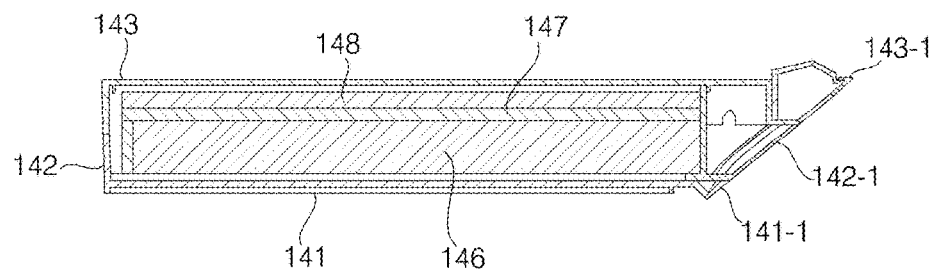
FIG. 8B is a lateral cross-sectional view of the filter unit illustrated in FIG. 8A.
Figure 9:
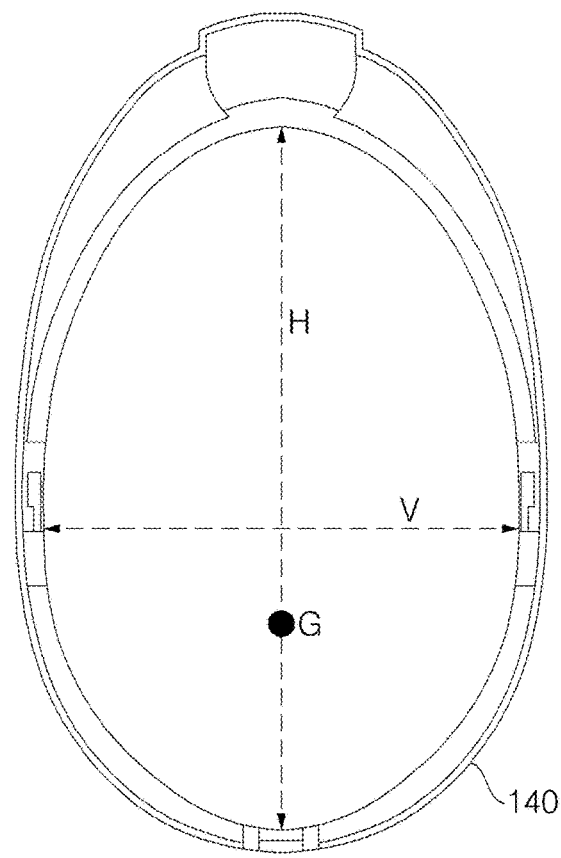
FIG. 9 is a front view of the filter unit illustrated in FIG. 8A.
Figure 10:
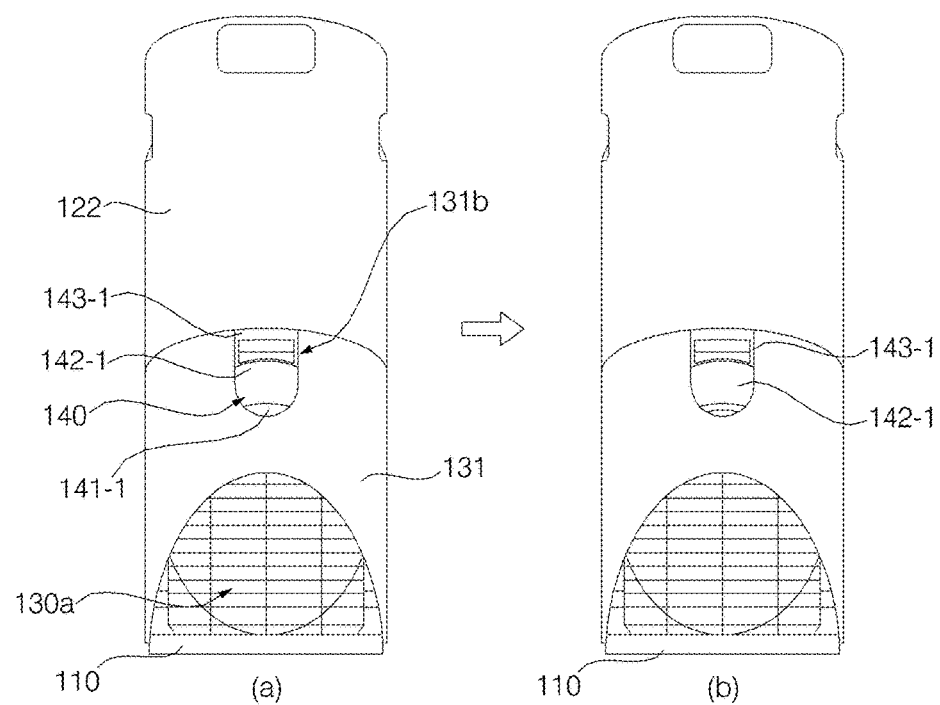
FIG. 10 is a view illustrating mounting of the filter unit illustrated in FIG. 8A.

FIG. 8A is an exploded perspective view illustrating the filter unit of the air purifier illustrated in FIG. 1. FIG. 8B is a lateral cross-sectional view of the filter unit illustrated in FIG. 8A. FIG. 9 is a front view of the filter unit illustrated in FIG. 8A. FIG. 10 is a view illustrating mounting of the filter unit illustrated in FIG. 8A.

Filter unit 140 according to the illustrated embodiment of the present invention is inclinedly arranged within body 120 while being seated in suction unit 130. The filter surface of filter unit 140, through which air passes, has an oval periphery. Filter unit 140 is seated on suction grill 132-1 and, as such, the filter surface is inclinedly arranged with respect to the central axis SA.

The filter surface of filter unit 140 is further inclined in an upward direction than the surface defined by the periphery of suction port 130a. Filter unit 140 is arranged such that the surface defined by the periphery of suction port 130a is further inclined from the horizontal direction than the filter surface. Air introduced through suction port 130a in forward and upward directions flows upwards in blowing unit 180. Accordingly, filter unit 140 arranged between suction port 130a and blowing unit 180 may be disposed to be closer to the horizontal direction than suction port 130a.

The filter surface of filter unit 140 may be less inclined in an upward direction than the surface defined by the periphery of discharge port 160a. Filter unit 140 may be arranged such that the surface defined by the periphery of discharge port 160a is less inclined from the horizontal direction than the filter surface.

As illustrated in FIG. 9, the periphery of the filter surface in filter unit 140 may have an ovoid shape in which a shorter axis V does not pass through the center of a longer axis H. That is, in the shape defined by the periphery of the filter surface, an upper portion thereof may have a smaller minimum curvature than a lower portion thereof.

Filter unit 140 may have an outline with an ovoid shape corresponding to the shape of the periphery of the filter surface. In the outline of filter unit 140, an upper portion thereof may have a smaller minimum curvature than a lower portion thereof such that the center of gravity G is positioned at a lower portion of filter unit 140.

Since the center of gravity G of filter unit 140 is positioned at the lower portion of filter unit 140, filter unit 140 stably inclinedly slides along the upper surface of suction grill 132-1 during mounting thereof. That is, filter unit 140 is inclinedly seated on the upper surface of suction grill 132-1 without overturn thereof. In addition, filter unit 140 does not overturn after mounting.

In accordance with the illustrated embodiment of the present invention, filter unit 140 includes a pre-filter 141 for removing foreign matter from air, a HEPA filter body 142 disposed above pre-filter 141, to form an accommodation space, a HEPA filter 146 seated in HEPA filter body 142, to collect contaminants from air, a deodorizing filter 147-148 disposed over HEPA filter 146, to remove odor components from air, and a deodorizing filter body 143 disposed over deodorizing filter 147-148 while being coupled to HEPA filter body 142.

Pre-filter 141 primarily removes foreign matter from the intake air passing through suction port 130a, which is formed with a grill. Pre-filter 132-1 is disposed on suction grill 132-1. A pre-filter protrusion 141-1 is formed at a rear side of pre-filter 141. Pre-filter protrusion 141-1 is exposed outwards through filter identifier 131b. Pre-filter protrusion 141-1 is inserted into open filter identifier 131b.

HEPA filter body 142 is open at a central portion thereof, and has a peripheral edge, on which HEPA filter 146 and deodorizing filter 147-148 are seated. The open portion of HEPA filter body 142 has an oval shape corresponding to that of suction port 130a. HEPA filter body 142 is disposed on pre-filter 141.

A HEPA filter protrusion 142-1 is formed at a rear side of HEPA filter body 142. HEPA filter protrusion 142-1 is disposed on pre-filter protrusion 141-1. HEPA filter protrusion 142-1 is exposed outwards through filter identifier 131b. HEPA filter protrusion 142-1 is inserted into open filter identifier 131b.

HEPA filter 146 is inserted into HEPA filter body 142, to collect contaminants from air sucked through suction port 130a. Deodorizing filter 147-148 is inserted into HEPA filter body 142 and, as such, is disposed on HEPA filter 146. Deodorizing filter 147-148 removes odor components from air sucked through suction port 130a.

HEPA filter 146 and deodorizing filter 147-148 have an oval shape corresponding to that of suction port 130a, to purify air sucked through suction port 130a as much as possible.

Deodorizing filter 147-148 may include a plurality of filter members. For example, deodorizing filter 147-148 may include a first deodorizing filter 147, and a second deodorizing filter 148 layered on first deodorizing filter 147.

HEPA filter 146 and deodorizing filter 147-148 form the filter surface as described above.

Deodorizing filter body 143 is disposed on deodorizing filter 147-148, and is separably coupled to HEPA filter body 142. Deodorizing filter body 143 is centrally formed with a grill, to prevent deodorizing filter 147-148 from protruding upwards.

A deodorizing filter protrusion 143-1 is formed at a rear side of deodorizing filter body 143. Deodorizing filter protrusion 143-1 is disposed on HEPA filter protrusion 142-1. Deodorizing filter protrusion 143-1 may have a recessed portion, to allow the user to grasp deodorizing filter protrusion 143-1. Deodorizing filter protrusion 143-1 is exposed outwards through filter identifier 131*b*. Deodorizing filter protrusion 143-1 is inserted into the open filter identifier 131*b*.

In order to prevent the user from forgetting to install any of HEPA filter 146 and deodorizing filter 147-148 during replacement of HEPA filter 146 or deodorizing filter 147-148 with a new one, pre-filter protrusion 141-1, HEPA filter protrusion 142-1, and deodorizing filter protrusion 143-1 are exposed outwards through filter identifier 131*b*.

When all constituent elements of filter unit 140 are assembled, pre-filter protrusion 141-1, HEPA filter protrusion 142-1, and deodorizing filter protrusion 143-1 are exposed outwards through filter identifier 131*b*, as illustrated in FIG. 10(*a*). When pre-filter 141 is omitted, only HEPA filter protrusion 142-1, and deodorizing filter protrusion 143-1 are exposed outwards through filter identifier 131*b*, as illustrated in FIG. 10(*b*).

As illustrated in FIG. 8B, ends of pre-filter protrusion 141-1, HEPA filter protrusion 142-1, and deodorizing filter protrusion 143-1 are formed to be inclined with respect to the filter surface. That is, rear ends of pre-filter protrusion 141-1, HEPA filter protrusion 142-1, and deodorizing filter protrusion 143-1 are formed to be inclined from an air flow direction in filter unit 140.

Filter unit 140 is inclinedly disposed and, as such, pre-filter protrusion 141-1, HEPA filter protrusion 142-1, and deodorizing filter protrusion 143-1, which will be exposed through filter identifier 131*b*, are inclinedly formed to be integrated with suction panel 131 of suction unit 130.

Figure 11:
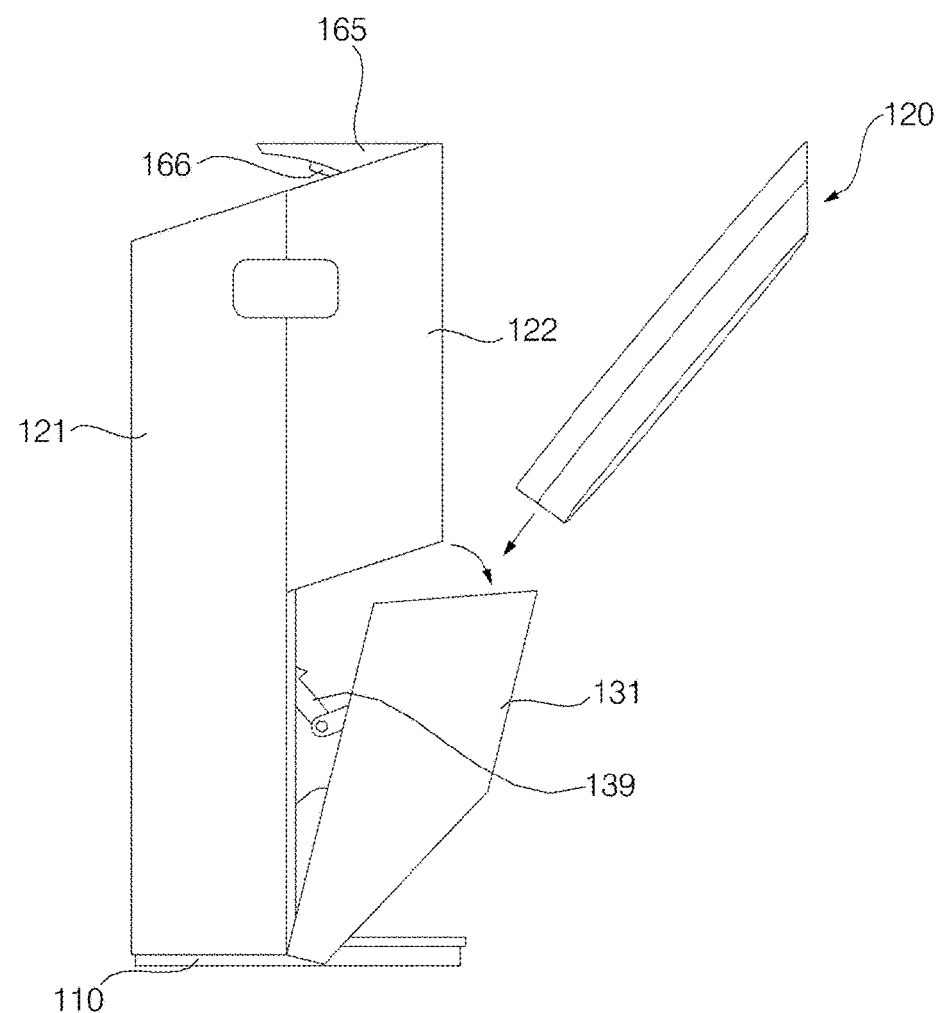
FIG. 11 is a view illustrating mounting of the filter unit in the air purifier illustrated in FIG. 1.
Figure 12:
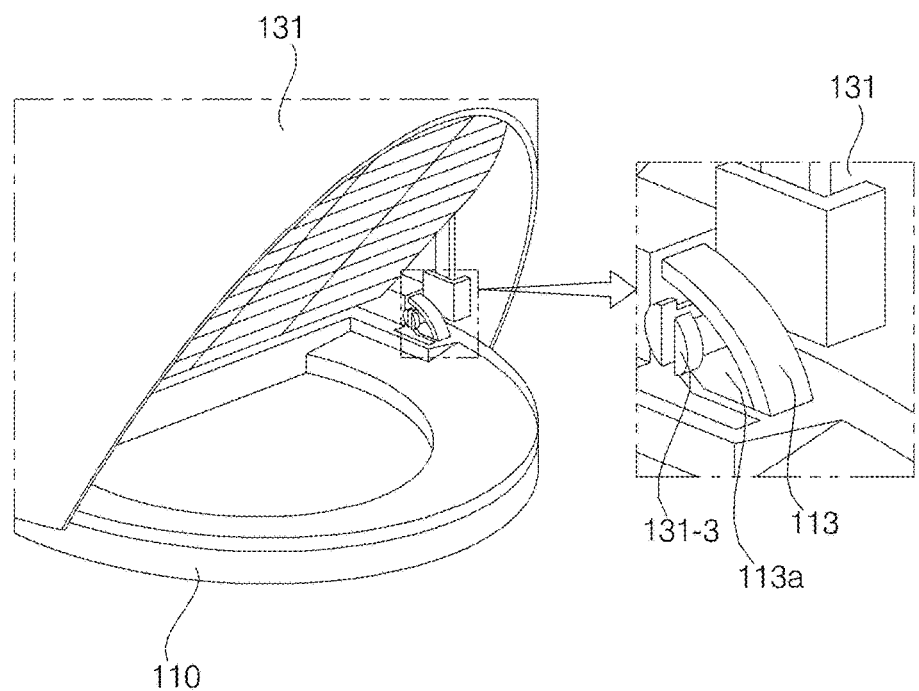
FIG. 12 is a view illustrating a part of a lower structure of the air purifier illustrated in FIG. 1.
Figure 13:
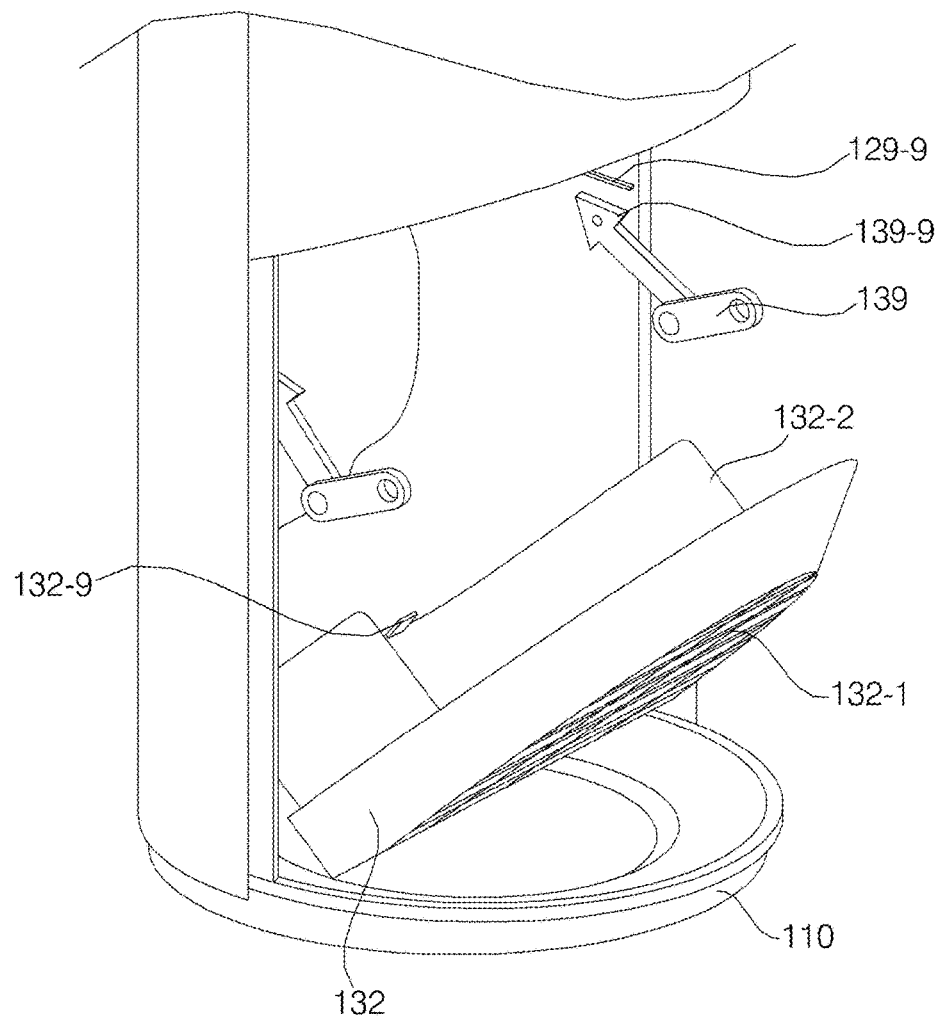
FIG. 13 is a view illustrating a part of an inner structure of the air purifier illustrated in FIG. 1.

FIG. 11 is a view illustrating mounting of the filter unit in the air purifier illustrated in FIG. 1. FIG. 12 is a view illustrating a part of a lower structure of the air purifier illustrated in FIG. 1. FIG. 13 is a view illustrating a part of an inner structure of the air purifier illustrated in FIG. 1.

Suction unit 130 according to the illustrated embodiment of the present invention is pivotally coupled to body 120, to open or close the interior of body 120. Suction unit 130 is opened in downward and rearward directions from body 120, to allow filter unit 140 to be inserted into body 120 or to be separated from body 120. Suction unit 130 is pivotable with respect to body 120 such that the rear side of suction unit 130 moves toward base 110.

Suction unit 130 is pivotally coupled to base 110 while being coupled to body 120 by a two-link mechanism. Suction panel 131 of suction unit 130 is provided with a base coupling pin 131-3 rotatably coupled to base 110. Base coupling pin 131-3 protrudes inwards from an inner surface of suction panel 131 at a lower end of suction panel 131.

Base 110 is formed with a suction panel coupling member 113 to be coupled to base coupling pin 131-3. Suction panel coupling member 113 is formed with a pin receiving slot 113*a* to receive base coupling pin 131-3. Pin receiving slot 113*a* has an arc shape, to allow base coupling pin 131-3 to slide therealong.

Base coupling pin 131-3 is rotatably and slidably coupled to pin receiving slot 113*a*. Accordingly, suction panel 131 conducts rotational movement and translational movement with respect to body 120 and, as such, pivots without interference with front panel 121 and rear panel 122 of body 120.

Suction unit 130 according to the illustrated embodiment of the present invention further includes a linkage 139 coupled to body 120. Linkage 139 is a two-link mechanism. Linkage 139 is centrally formed with a rotation joint. Linkage 139 is pivotally coupled to inner panel 129 of body 120 while being pivotally coupled to suction panel 131.

Linkage 139 is formed with a link protrusion 139-9 protruding upwards, at a portion thereof coupled to inner panel 129. Inner panel 129 of body 120 is formed with a link stopper 129-9. Link protrusion 1239-9 is engaged with link stopper 129-9 during opening of suction unit 130, thereby preventing suction unit 130 from pivoting excessively. Link protrusion 139-9 is engaged with link stopper 129-9 in order to prevent suction panel 131 from contacting the surface (e.g., floor) or base 110 due to excessive pivoting of suction unit 130.

As illustrated in FIG. 13, suction body 132 is formed with a filter fixing portion 132-9 protruding from filter support 132-2 in a direction parallel to a surface defined by suction grill 132-1, to lock a portion of filter unit 140. Filter fixing portion 132-9 contacts a front upper portion of filter unit 140, to prevent filter unit 140 from being separated in an upward direction during seating thereof on suction grill 132-1.

As illustrated in FIG. 11, suction unit 130 pivots from body 120, thereby opening the interior of body 120. The user may mount filter unit 140 in body 120 through the opened region or may separate filter unit 140 from body 120 through the opened region. When it is desired to mount filter unit 140 in body 120, the user pushes filter unit 140 into the opened region. In this case, filter unit 140 slides along suction grill 132-1, and is then seated on suction grill 132-1 by filter support 132-2. Even when the user closes suction unit 130 after mounting filter unit 140 in suction unit 130, filter unit 140 does not overturn or is not separated in forward and upward directions by virtue of the center of gravity G of filter unit 140 positioned at a low level and filter fixing portion 132-9.

Figure 14:
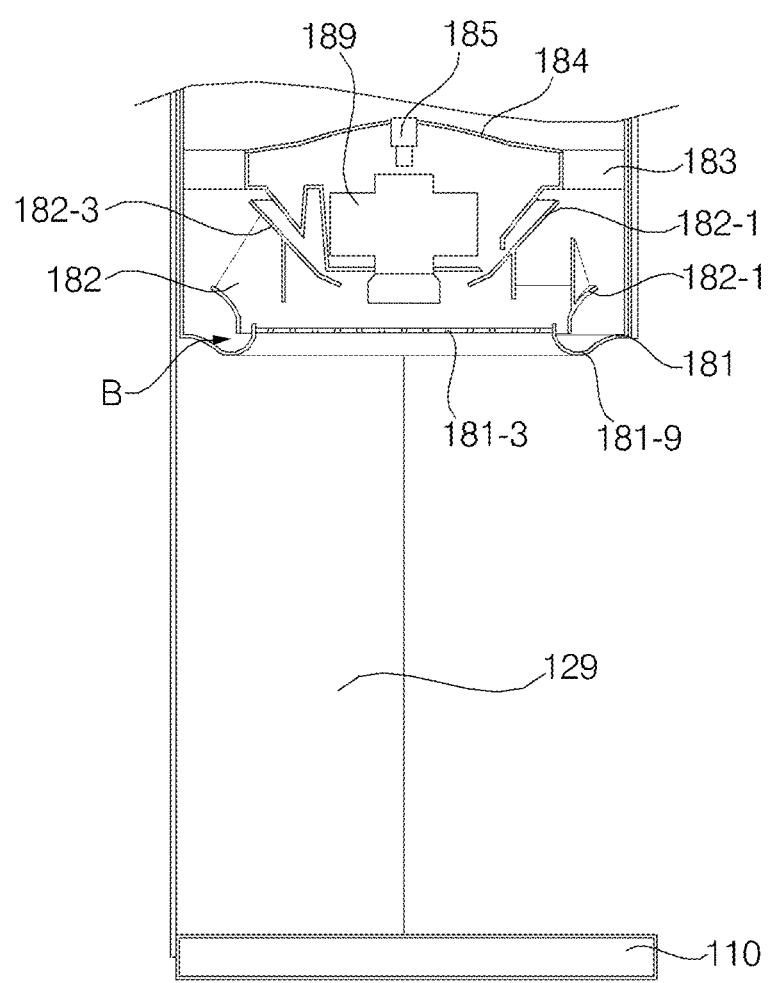
FIG. 14 is a sectional view illustrating a part of the air purifier illustrated in FIG. 1.
Figure 15:
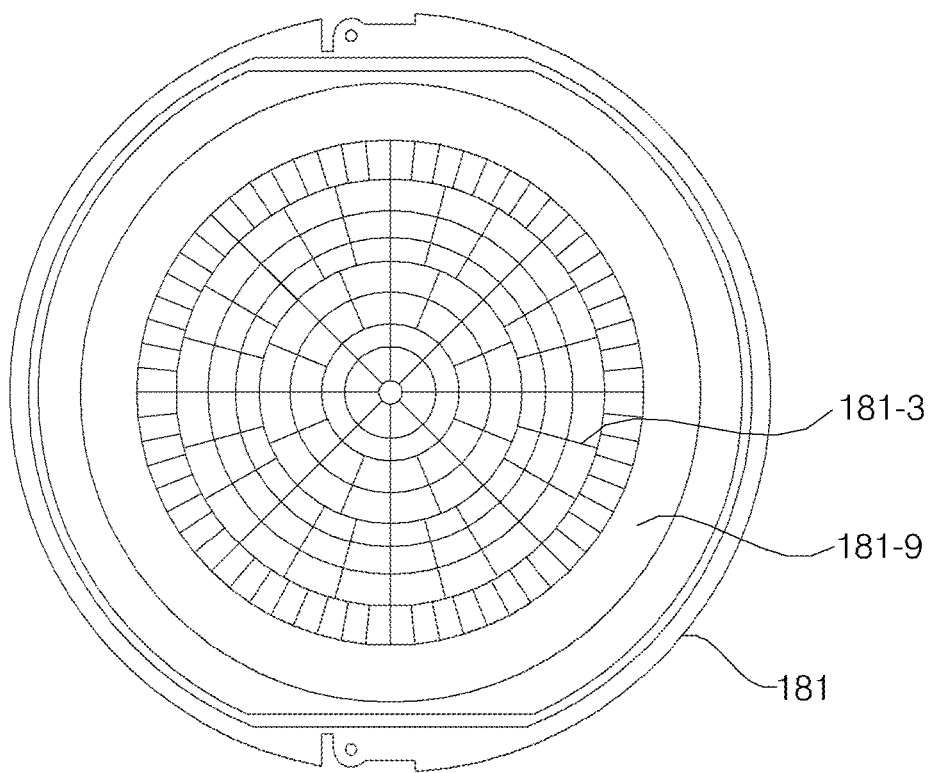
FIG. 15 is a rear view of a blowing body in the air purifier illustrated in FIG. 1.
Figure 16:
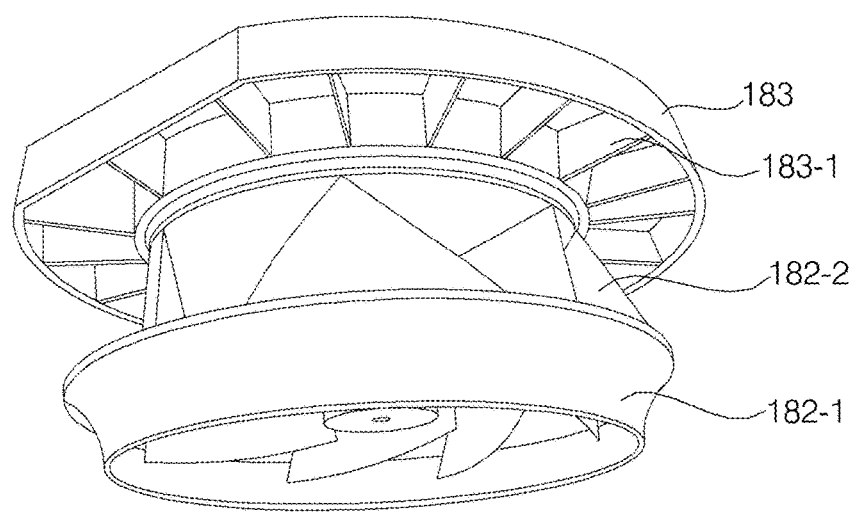
FIG. 16 is a perspective view of a blowing fan in the air purifier illustrated in FIG. 1.
Figure 17:
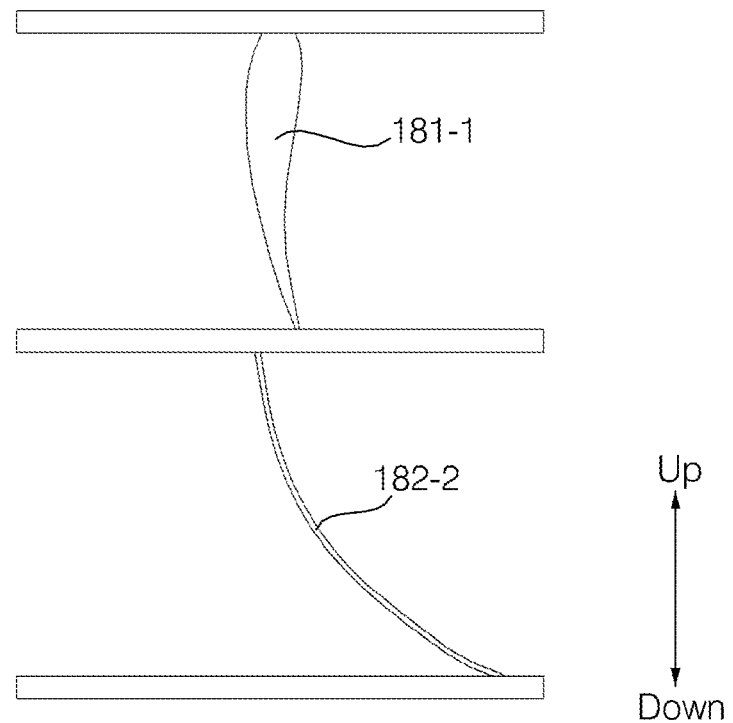
FIG. 17 is a view illustrating a part of a structure of the blowing unit in the air purifier illustrated in FIG. 1.

FIG. 14 is a sectional view illustrating a part of the air purifier illustrated in FIG. 1. FIG. 15 is a rear view of the blowing body in the air purifier illustrated in FIG. 1. FIG. 16 is a perspective view of the blowing fan in the air purifier illustrated in FIG. 1. FIG. 17 is a view illustrating a part of a structure of the blowing unit in the air purifier illustrated in FIG. 1.

Blowing fan 182 rotates by motor 189, thereby blowing air. Blowing fan 182 intakes (i.e, sucks) air through suction port 130*a*, and discharges sucked air through discharge port 160*a*.

Vane member 183 is arranged over blowing fan 182. Blowing unit body 181 is arranged at a lower portion of blowing fan 182 around blowing fan 182. As illustrated in FIG. 16, in the illustrated embodiment, blowing fan 182 is a centrifugal fan, which intakes (i.e, sucks) air from a bottom side, namely, the side of suction unit 130, and laterally discharges the intake air through discharge port 160*a*. The centrifugal fan exhibits a greater amount of blown air than other kinds of fans at the same rotation speed and at the same size. Accordingly, blowing fan 182 may be realized by a centrifugal fan.

Blowing fan 182 includes a shroud 182-1, through which air is introduced, a plurality of blades 182-2 arranged over shroud 182-1 while being spaced apart from one another in a circumferential direction, and a hub 182-3 coupled to motor 189 while supporting blades 182-2.

Shroud 182-1 is formed to have an orifice shape defining a flow channel narrowing gradually in a downward direction. Shroud 182-1 has a lower end having a circular shape. Shroud 182-1 is connected to respective ends of blades 182-2.

Blades 182-2 laterally feed air introduced through shroud 182-1 during rotation thereof. As illustrated in FIG. 7, each blade 182-2 has, at an air discharge side thereof, a trailing edge bent in a diagonal direction so as to cause discharged air to flow as upward as possible.

Each blade 182-2 also has, at an air introduction side thereof, a leading edge considerably shorter than the trailing edge so as to cause discharged air to flow as upward as possible. Each blade 182-2 is connected, at an upper end thereof, to hub 182-3 while being connected, at a lower end thereof, to shroud 182-1.

Hub 182-3 is spaced apart from shroud 182-1. Hub 182-3 is connected to motor 189. Hub 182-3 may have a relatively sharp inclination so as to cause discharged air to flow as upward as possible. That is, hub 182-3 may have an outer diameter abruptly reduced as hub 182-3 extends from the side of motor 189 to the side of shroud 182-1. Hub 182-3 is connected to respective upper ends of blades 182-2.

Air discharged from blowing fan 182, which is a centrifugal fan, flows smoothly in an upward direction by virtue of the outer surface shape of hub 182-3, the shape of blades 182-2, and the closed peripheral surface of blowing body 181.

Blowing body 181 surrounds the lower portion of blowing fan 182 around blowing fan 182. Blowing body 181 guides air laterally discharged from blowing fan 182 toward discharge unit 160, namely, in an upward direction. Blowing body 181 is formed, at a lower surface thereof, with a blowing grill 181-3, through which air introduced into shroud 182-1 passes. The peripheral surface of blowing body 181 does not have any open portion, namely, has the form of a blind wall and, as such, guides air laterally discharged from blowing fan 182 in an upward direction.

Blowing body 181 is formed, at a lower end thereof, with a ring-shaped space forming portion 181-9 extending upwards around blowing grill 181-3. The space forming portion 181-9 defines a space B spaced apart from a lower end of shroud 182-1. The space forming portion 181-9 forms the space B between the lower end of shroud 182-1 and the lower end of blowing body 181 and, as such, air flowing downwards from the trailing edges of blades 182-2 is forced to again flow upwards, thereby achieving suppression of noise generation and an enhancement in efficiency. That is, air flowing into the space B formed by the space forming portion 181-9 among air discharged via blades 182-2 is introduced into shroud 182-1.

Vane member 183 guides upwards air guided upwards by blowing body 181 by blowing fan 182. Air emerging from vane member 183 is guided to duct 151 and, as such, flows to discharge unit 160.

Motor 189 is arranged at a central portion of vane member 183. Blowing fan 182 is arranged beneath vane member 183. Vane member 183 is coupled, at a lower end periphery thereof, to an upper end periphery of blowing body 181.

Vane member 183 includes a plurality of vanes 183-1 extending radially while being spaced apart from one another in a circumferential direction. Each vane 183-1 has a plate shape erected in a vertical direction. Vanes 183-1 are arranged to extend toward a center of vane member 183. Air guided upwards by blowing body 181 flows upwards by vanes 183-1.

Referring to FIG. 17, each vane 183-1 has the form of an airfoil bent in a bending direction of the trailing edge of each blade 182-2. Accordingly, vanes 183-1 enable air discharged by blades 182-2 to flow smoothly upwards while reducing noise.

Figure 21:
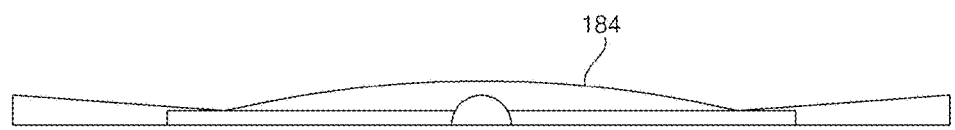
FIG. 21 is a side view illustrating the shape of the motor dome illustrated in FIG. 4.

Motor cover 184 is coupled, at a lower surface thereof, to motor 189 while being coupled to a top of vane member 183. Motor cover 184 has a dome shape in which a central portion thereof is convex upwards and, as such, it is possible to prevent generation of turbulent flow of air when air discharged from a peripheral edge of vane member 183 is introduced into duct 151. The dome shape of the motor cover 184 is more explicitly illustrated in FIG. 21. The dome shape helps to prevent particles (e.g., dust) from gathering on the top of the motor cover. Eliminating areas for contaminants to collect facilitates air purification.

Blowing unit 180 further includes an ionizer 185 arranged at motor cover 184, to ionize air flowing through blowing fan 182. A plurality of ionizers 185 may be provided at a central portion of motor cover 184.

Figure 18:
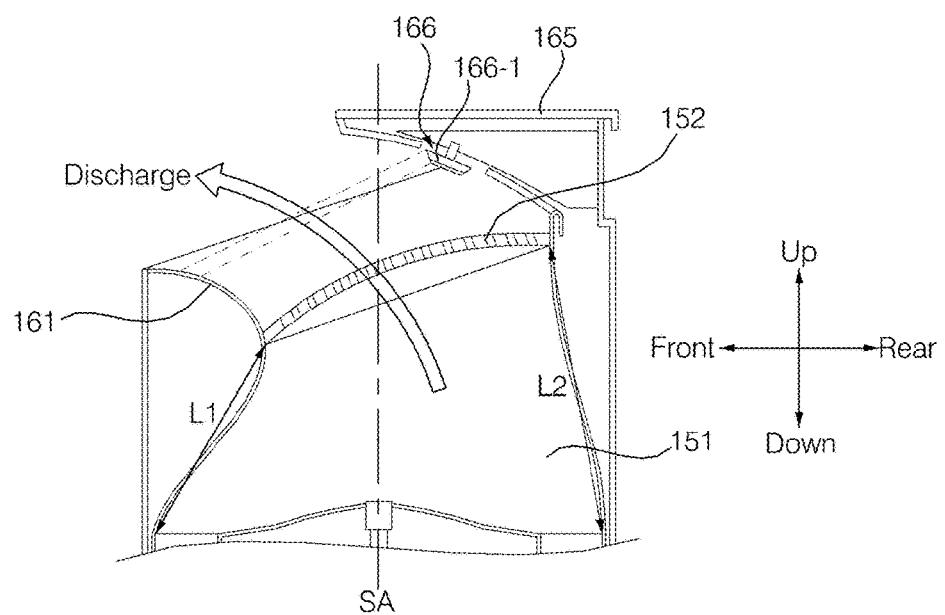
FIG. 18 is a sectional view illustrating an upper part of the air purifier illustrated in FIG. 1.
Figure 19:
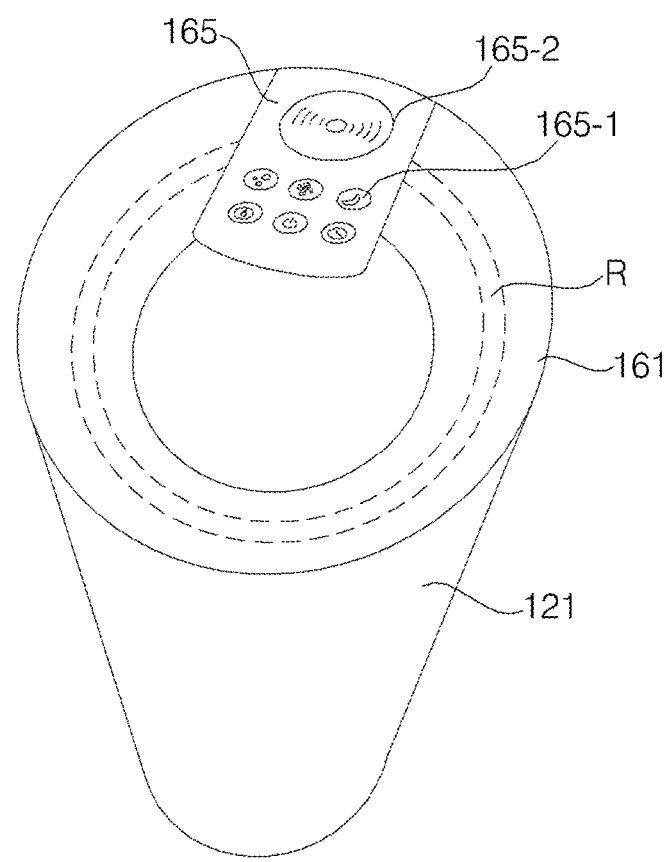
FIG. 19 is a perspective view of the air purifier illustrated in FIG. 1.
Figure 20:
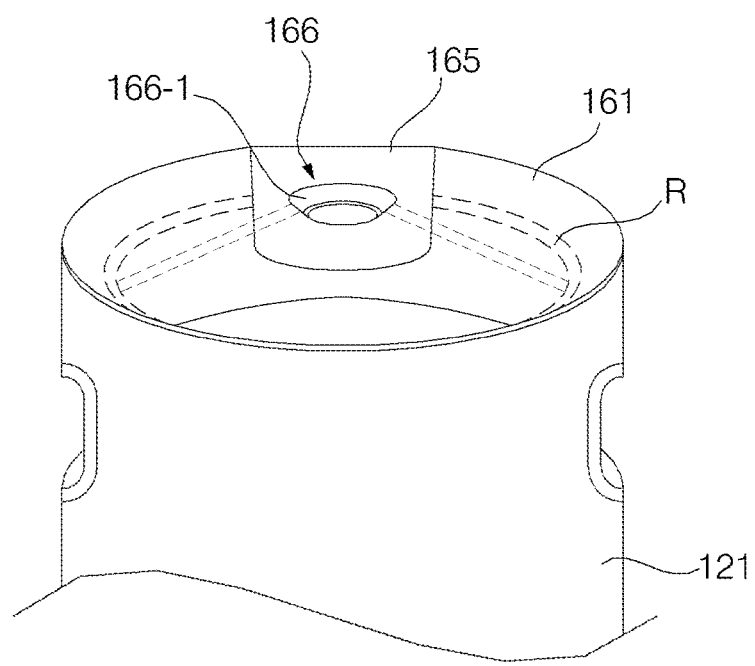
FIG. 20 is a view illustrating a function of a lighting unit in the air purifier illustrated in FIG. 1.

FIG. 18 is a sectional view illustrating an upper part of the air purifier illustrated in FIG. 1. FIG. 19 is a perspective view of the air purifier illustrated in FIG. 1. FIG. 20 is a view illustrating a function of the lighting unit in the air purifier illustrated in FIG. 1.

Duct 151 guides, to discharge unit 160, air flowing upwards by blowing unit 180. Duct 151 has a lower-end periphery defining a surface perpendicular to the central axis SA while having an upper-end periphery defining a surface inclined from the central axis SA and, as such, air flowing upwards by blowing unit 180 is guided in forward and upward directions by duct 151.

Duct 151 guides air introduced toward central axis SA of the cylindrical portion of body 120 by blowing unit 180 such that the air flows in a direction inclined from the central axis SA of the cylindrical portion of body 120. That is, duct 151 guides air flowing in an upward direction perpendicular to blowing unit 180 such that the air flows in forward and upward directions.

Duct 151 has a front-end length L1 shorter than a rear-end length L2 thereof and, as such, air flowing upwards by blowing unit 180 is guided to flow in a direction that the periphery of discharge port 160a extends, namely, in forward and upward directions.

The surface defined by the upper-end periphery of duct 151 is smaller than the surface defined by the lower-end periphery of duct 151. That is, the air channel of duct 151 narrows gradually in an upward direction.

The surface defined by the lower-end periphery of discharge panel 161 coupled to the top of duct 151 is inclined from the central axis SA. The surface defined by the upper-end periphery of discharge panel 161 is also inclined from the central axis SA. The surface defined by the upper-end periphery of discharge panel 161 extends in the same direction as the surface defined by the lower-end periphery of discharge panel 161. That is, the surface defined by the upper-end periphery of discharge panel 161 and the surface defined by the lower-end periphery of discharge panel 161 extend in forward and upward directions.

Discharge port 160a of discharge panel 161 has a frustoconical shape widening gradually in an upward direction. The inner surface of discharge panel 161 is curved to diverge in an upward direction. Discharge port 160a has a discharge area increasing gradually in an upward direction, to allow discharged air to be widely spread.

Console unit 165 adjusts the discharge direction of air discharged through discharge port 160a defined by discharge panel 161. The lower surface of console unit 165 is formed to be closer to the horizontal direction parallel to the floor as the lower surface of console unit 165 extends in an upward direction. That is, the lower surface of console unit 165 is formed to be closer to a direction perpendicular to the central axis SA as the lower surface of console unit 165 extends in an upward direction and, as such, guides air discharged toward a rear side of discharge port 160a to flow as forward as possible.

The lower surface of console unit 165 has a shape corresponding to the shape of the inner surface of discharge panel 161 at the front portion of discharge panel 161. That is, the lower surface of console unit 165 has a curved shape corresponding to the curved shape of the inner surface of discharge panel 161 at the front portion of discharge panel 161. Accordingly, air discharged through discharge port 160a of discharge panel 161 flows in forward and upward directions.

Lighting unit 166 is disposed at the lower surface of console unit 165, to irradiate light onto discharge panel 161. The light source is disposed in lighting unit 166. In the illustrated embodiment, the light source may be a light emitting diode (LED). Lighting unit 166 may emit light of various colors.

Lighting unit 166 may have a disc shape so as to uniformly irradiate light onto discharge panel 161. Lighting unit 166 may have as small a thickness as possible so as to be prevented from interfering with air flowing along the lower surface of console unit 165.

Lighting unit 166 may emit light through a side surface thereof. Light emitted from the light source of lighting unit 166 is irradiated through the side surface of lighting unit 166. The side surface of lighting unit 166 is made of a transparent material, to allow light to pass therethrough.

The side surface of lighting unit 166 is formed to be inclined toward the inner surface of discharge panel 166. The side surface of lighting unit 166 is inclinedly formed to allow light emitted from lighting unit 166 to be reflected in a flow direction of air discharged through discharge port 161a after being reflected from the inner surface of discharge panel 161. The side surface of lighting unit 166 is inclined such that the periphery of lighting unit 166 is gradually widened in an upward direction.

The inner surface of discharge panel 161 is formed such that an upper portion thereof is exposed outwards and, as such, light emitted from the lighting unit 166 is reflected in the form of a ring shape R. The ring shape R of light reflected from discharge panel 161 is formed in accordance with the shape of the inner surface of discharge panel 161. In the illustrated embodiment, the ring shape R is an oval or circular shape.

As described above, in discharge panel 161, the surface defined by the upper-end periphery thereof is greater than the surface defined by the lower-end periphery thereof. Accordingly, light emitted from lighting unit 166 is reflected in the form of the ring shape R from a portion of the inner surface of discharge panel 161 beneath the upper-end periphery of discharge panel 161.

The inner surface of discharge panel 161 is formed to have a curved surface diverging in an upward direction, as described above. Accordingly, the inner surface of discharge panel 161 reflects light emitted from lighting unit 166 in the form of the ring shape R.

Discharge panel 161 is formed to reflect light emitted from lighting unit 166 in a flow direction of air discharged through discharge port 160a. Discharge panel 161 is formed to reflect light emitted from lighting unit 166 in a direction inclined from the central axis SA. That is, discharge panel 161 is formed to reflect light emitted from lighting unit 166 in forward and upward directions.

The surface defined by the ring shape R formed by light reflected by discharge panel 161 may be inclined from the central axis SA. The surface defined by the ring shape R formed by light reflected by discharge panel 161 may be parallel to the surface defined by one of the peripheries of discharge port 160a. The surface defined by the ring shape R formed by light reflected by discharge panel 161 may be parallel to the upper-end periphery or lower-end periphery of discharge panel 161.

Console unit 165 includes an operating unit 165-1 disposed on an upper surface of console unit 165 perpendicular to the central axis SA, to receive an input from the user, and a display unit 165-2 disposed on the upper surface of console unit 165, to display an operation state of the air purifier. Display unit 165-2 may emit light, to display an operation state of the air purifier. Display unit 165-2 may emit light of various colors. Display unit 165-2 may emit light of the same color as light emitted from lighting unit 166.

Lighting unit 166 may emit light of different colors according to different contamination degrees of air sucked into suction port 130a. A contamination sensor (not shown) is provided at body 120, to measure a contamination degree of air sucked into suction port 130a. Lighting unit 166 emits light of different colors according to different contamination degrees measured by the contamination sensor.

For example, when the contamination degree of air is high, lighting unit 166 emits red light and, as such, the ring shape R exhibits red. When the contamination degree of air is low, lighting unit 166 emits green light and, as such, the ring shape R exhibits green. Similarly, display unit 165-2 emits red light when the contamination degree of air is high, and emits green light when the contamination degree of air is low.

Hereinafter, operation of the air purifier as described above will be described.

When blowing fan 182 rotates by motor 189, ambient air is intook (i.e, sucked) through suction port 130a of suction unit 130. Ambient air present near the lower portion of the air purifier at the rear side of the air purifier is sucked through suction port 130a in forward and upward directions.

Intake air sucked through suction port 130a is filtered while passing through pre-filter 141 of filter unit 140, to remove foreign matter therefrom. The resultant air then passes through HEPA filter 146 and, as such, contaminants are collected. Thereafter, the air passes through deodorizing filter 147-148 and, as such, odor components are removed.

The air purified while passing through filter unit 140 flows upwards along inner panel 129 and, as such, reaches blowing grill 181-3 of blowing body 181.

Air emerging from blowing grill 181-3 is introduced into shroud 182-1, and is then discharged along the trailing edges of blades 182-2. Air discharged from blades 182-2 flows upwards along the peripheral surface of blowing body 181, and then flows upwards while passing vanes 183-1. In this case, a portion of air discharged from blades 182-2, namely, air flowing downwards, is again introduced into shroud 182-1 via the space B defined between blowing body 181 and the space forming portion 181-9.

Air emerging from vanes 183-1 is introduced into duct 151 above motor cover 184. Air introduced into duct 151 is guided in forward and upward directions and, as such, is discharged through discharge port 160a of discharge panel 161.

Air emerging from discharge port 160a of discharge panel 161 is discharged in forward and upward directions of the air purifier by discharge panel 161 and the lower surface of console unit 165.

Meanwhile, during operation of motor 189, lighting unit 166 irradiates, onto discharge panel 161, light of a color according to the contamination degree of air sucked into suction port 130a. Discharge panel 161 reflects light irradiated from lighting unit 166 in the form of the ring shape R.

The above-described technical idea may be applied not only to an air purifier, but also to an air conditioner and the like, in which air flows.

Although the preferred embodiments of the present invention have been disclosed for illustrative purposes, those skilled in the art will appreciate that various modifications, additions and substitutions are possible, without departing from the scope and spirit of the invention.

One or more of the following effects may be provided in accordance with the air purifier of the present disclosure.

First, there is an advantage in that it is possible to minimize an installation area while achieving an increase in air purification capacity.

Second, the body of the air purifier, in which the blowing fan is arranged, has a cylindrical shape and, as such, there are advantages in that it is possible not only to simplify flow of air in the air purifier, but also to minimize generation of noise while maximizing the amount of blown air.

Third, the discharge port and suction port formed at the cylindrical body have oval shapes and, as such, there are advantages in that it is possible to maximize the amount of sucked air and the amount of discharged air, thereby achieving a maximum air purification capacity while minimizing generation of noise.

Fourth, there is an advantage in that it is possible to reduce generation of noise while achieving a maximum amount of blown air, using a centrifugal fan.

Fifth, discharged air is guided to flow in forward and upward directions and, as such, there is an advantage of an enhancement in air purification efficiency.

Sixth, a simple appearance is provided, and simple assembly and disassembly are achieved and, as such, there are advantages of high productivity and high-quality service.

What is claimed is:

1. An air purifier comprising:
a body having a cylindrical shape at a portion thereof;
a suction unit arranged within a lower portion of the body, having a suction port with a periphery surface that is inclined from a central axis of the body;
a discharge unit arranged within an upper portion of the body, having a discharge port with a periphery surface that is inclined from the central axis of the body;
a blowing unit arranged within the body, to blow air from the suction unit to the discharge unit;
a base disposed on a surface, to support the body; and
a duct coupled to a top surface of the blowing unit, to guide air blown by the blowing unit to the discharge unit,
wherein the body comprises:
a front panel having a partial-cylindrical shape;
a rear panel having a partial-cylindrical shape; and
an inner panel coupled to the base and provided at a rear side of the front panel, the inner panel having a partial-cylindrical shape,
wherein a top surface of the inner panel is coupled to the blowing unit,
wherein the suction unit is arranged at a rear side of the inner panel, the inner panel to guide air introduced through the suction port to flow in an upward direction,
wherein:
the front panel includes, at an inner surface thereof, a duct coupling protrusion; and
the duct includes, at an outer surface thereof, a protrusion receiving member to receive the duct coupling protrusion.

2. The air purifier of claim 1, wherein:
the suction unit is provided below the rear panel; and
the suction port intakes air.

3. The air purifier of claim 1, wherein the discharge port outputs air.

4. The air purifier of claim 1, wherein the inner panel is coupled to a front semicircular portion of the base.

5. The air purifier of claim 1, wherein the suction unit is spaced apart from a rear semicircular portion of the base.

6. The air purifier of claim 1, wherein:
the blowing unit includes, at a lower end thereof, an inner panel coupling protrusion; and
the inner panel includes, at an upper end thereof, a protrusion receiving member to receive the inner panel coupling protrusion.

7. The air purifier of claim 1, wherein the suction unit is pivotally coupled to the inner panel.

8. The air purifier of claim 1, wherein the discharge unit is coupled to a top surface of the duct.

9. The air purifier of claim 1, wherein:
the front panel includes a rear panel coupling protrusion at a lateral end of an inner surface thereof; and
the rear panel includes, at a lateral end of an inner surface thereof, a protrusion receiving member to receive the rear panel coupling protrusion.

10. The air purifier of claim 1, wherein the body further comprises a handle coupled to both a side surface of the front panel and a side surface of the rear panel.

11. The air purifier of claim 1, wherein:
the front panel has an upper end portion that is inclined from the central axis of the body,
the rear panel has an upper end portion that is inclined from the central axis of the body, and
the upper end of the rear panel is joined with the upper end of the front panel.

12. The air purifier of claim 11, wherein the rear panel has a lower end portion that is inclined and substantially parallel to the upper end portion of the rear panel.

13. The air purifier of claim 1, wherein the periphery surface of the suction port has an oval shape or an ovoid shape.

14. The air purifier of claim 1, wherein the periphery surface of the discharge port has an oval shape or an ovoid shape.

15. The air purifier of claim 1, further comprising:
a lighting unit having a light source to emit light onto the discharge port to indicate a degree of contamination in the air.

* * * * *